(12) United States Patent
Polozola et al.

(10) Patent No.: US 7,961,858 B2
(45) Date of Patent: *Jun. 14, 2011

(54) SYSTEMS AND METHODS FOR ACCOUNT ESTABLISHMENT AND TRANSACTION MANAGEMENT

(75) Inventors: Michelle L. Polozola, Richardson, TX (US); Anthony Hershberger, McKinney, TX (US); Robert L. Rae, Plano, TX (US); Marc Hite, Plano, TX (US); Luke Keiser, Frisco, TX (US)

(73) Assignee: Securus Technologies, Inc., Dallas, TX (US)

( * ) Notice: Subject to any disclaimer, the term of this patent is extended or adjusted under 35 U.S.C. 154(b) by 1384 days.

This patent is subject to a terminal disclaimer.

(21) Appl. No.: 11/480,264

(22) Filed: Jun. 30, 2006

(65) Prior Publication Data

US 2007/0263812 A1    Nov. 15, 2007

Related U.S. Application Data

(63) Continuation-in-part of application No. 11/386,032, filed on Mar. 21, 2006, now Pat. No. 7,860,226, which is a continuation-in-part of application No. 10/360,248, filed on Feb. 7, 2003, now Pat. No. 7,042,992.

(51) Int. Cl.
*H04M 15/00* (2006.01)
(52) U.S. Cl. ............ 379/114.21; 379/114.2; 379/114.23
(58) Field of Classification Search ............ 379/114.01, 379/114.05, 114.1, 114.13, 114.17, 114.19, 379/114.2, 114.21–114.23, 127.02, 127.05, 379/144.01–144.03, 145, 188, 186; 705/52–54, 705/75, 78
See application file for complete search history.

(56) References Cited

U.S. PATENT DOCUMENTS

| 5,185,781 | A  | 2/1993  | Dowden et al. |
|-----------|----|---------|---------------|
| 5,210,789 | A  | 5/1993  | Jeffus et al. |
| 5,485,507 | A  | 1/1996  | Brown et al.  |
| 5,517,555 | A  | 5/1996  | Amadon et al. |
| 5,627,887 | A  | 5/1997  | Freedman      |
| 5,655,013 | A  | 8/1997  | Gainsboro     |
| 5,832,068 | A  | 11/1998 | Smith         |
| 5,859,902 | A  | 1/1999  | Freedman      |
| 5,875,236 | A  | 2/1999  | Jankowitz et al. |
| 5,894,511 | A  | 4/1999  | Jordan        |
| 5,937,044 | A  | 8/1999  | Kim           |
| 6,327,345 | B1 | 12/2001 | Jordan        |

(Continued)

OTHER PUBLICATIONS

International Search Report for European Patent Application No. 07252653.6 based on U.S. Appl. No. 11/480,264, "Systems and Methods for Account Management Using Interrupt Messaging," Evercom Systems, Inc., Mar. 3, 2008, 12 pages.

(Continued)

*Primary Examiner* — Quoc D Tran
(74) *Attorney, Agent, or Firm* — Fogarty, L.L.C.

(57) ABSTRACT

Disclosed are systems and methods which provide techniques providing account setup, management and transaction authorization determinations in real-time using transaction interrupt messaging. Embodiments preferably take into consideration the quality of one or more parties to the transaction and the means by which charges may be rendered to them when making account setup, management, and/or transaction authorization determinations. Accordingly, transactions, such as collect calls, meeting at least some minimal risk threshold may be completed on a first call attempt, even where a pre-arranged billing agreement or other business relationship is not previously in place.

32 Claims, 9 Drawing Sheets

U.S. PATENT DOCUMENTS

| | | |
|---|---|---|
| 6,396,915 B1 | 5/2002 | Springer et al. |
| 6,516,056 B1 | 2/2003 | Justice et al. |
| 6,639,977 B1 | 10/2003 | Swope et al. |
| 6,639,978 B2 | 10/2003 | Draizin et al. |
| 6,836,540 B2 | 12/2004 | Falcone et al. |
| 7,042,992 B1 | 5/2006 | Falcone et al. |
| 7,158,621 B2 * | 1/2007 | Bayne ................. 379/114.13 |
| 2002/0194096 A1 | 12/2002 | Falcone et al. |
| 2003/0002639 A1 | 1/2003 | Huie |
| 2003/0076940 A1 | 4/2003 | Manto |
| 2003/0112936 A1 | 6/2003 | Brown et al. |
| 2003/0200182 A1 | 10/2003 | Truitt et al. |
| 2007/0041535 A1 * | 2/2007 | Forrest ................. 379/114.21 |

OTHER PUBLICATIONS

U. S. Appl. No. 10/135,878 filed Apr. 29, 2002.
U. S. Appl. No. 10/360,442 filed Feb. 7, 2003.
U. S. Appl. No. 11/386,032 filed Mar. 21, 2006.
U. S. Appl. No. 11/386,056 filed Mar. 21, 2006.

* cited by examiner

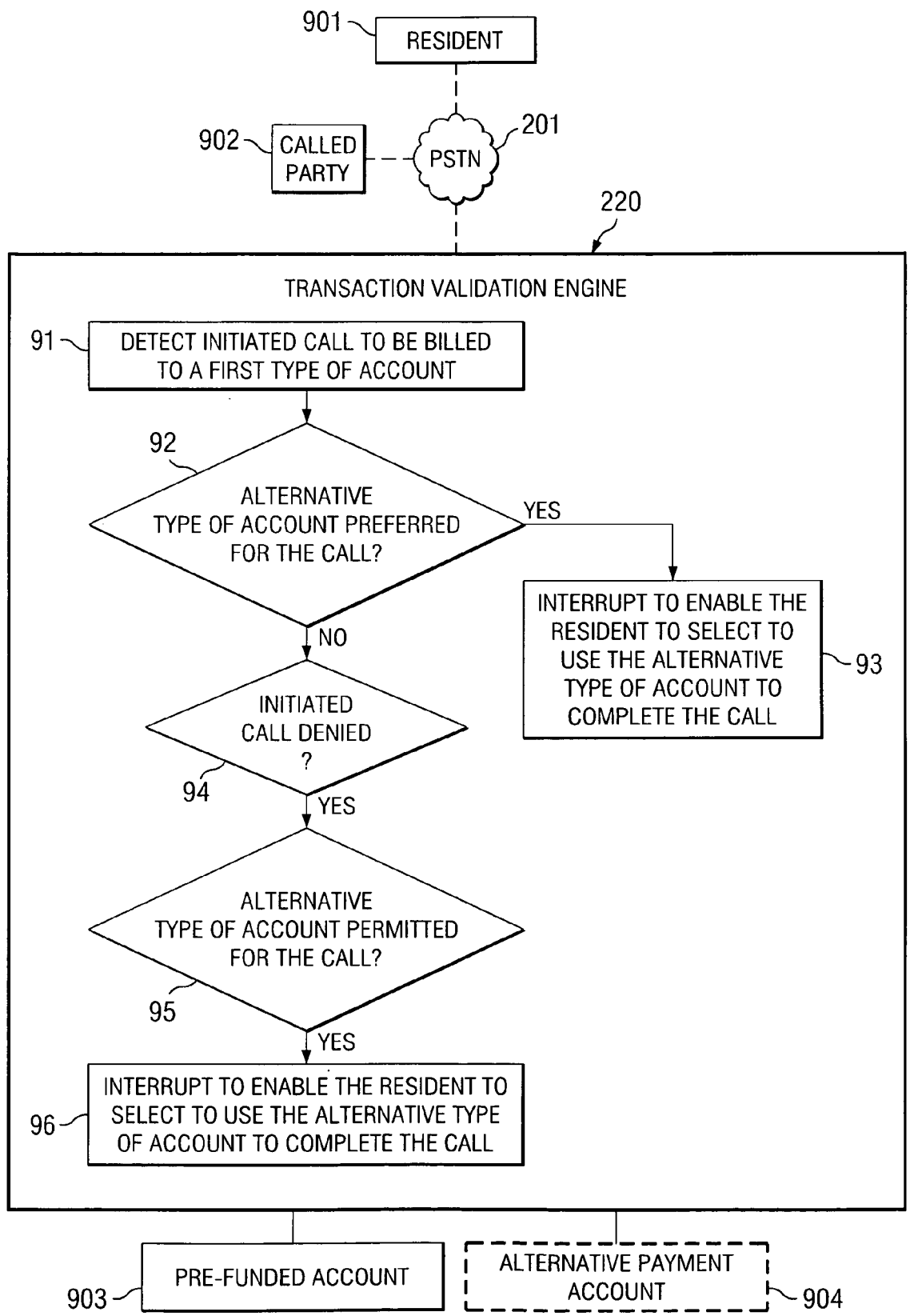

SYSTEMS AND METHODS FOR ACCOUNT ESTABLISHMENT AND TRANSACTION MANAGEMENT

CROSS-REFERENCE TO RELATED APPLICATIONS

This application is a continuation-in-part of U.S. patent application Ser. No. 11/386,032 titled 'SYSTEMS AND METHODS FOR ACCOUNT MANAGEMENT USING INTERRUPT MESSAGE' filed Mar. 21, 2006, which application is a continuation-in-part of U.S. patent application Ser. No. 10/360,248 titled "SYSTEMS AND METHODS FOR ACCOUNT ESTABLISHMENT AND TRANSACTION MANAGEMENT USING INTERRUPT MESSAGING" filed Feb. 7, 2003, the disclosures of which are hereby incorporated herein by reference.

The present application is also related to co-pending and commonly assigned U.S. patent application Ser. No. 10/360,442 filed Feb. 7, 2003 titled "SYSTEMS AND METHODS FOR TRANSACTION AUTHORIZATION DETERMINATION," Ser. No. 10/135,883, now Published Application No. 2002/0194096, published Dec. 19, 2002, titled "OPTIMIZING PROFITABILITY IN BUSINESS TRANSACTIONS," and Ser. No. 10/135,878 filed Apr. 29, 2002 entitled "INFORMATION MANAGEMENT AND MOVEMENT SYSTEM AND METHOD," the disclosures of which are hereby incorporated herein by reference.

The present application is also related to commonly assigned U.S. Pat. No. 6,836,540 entitled "System and Methods for Offering a Service to a Party Associated with a Blocked Call," which issued from an application filed Jul. 3, 2002, and U.S. Pat. No. 6,639,978 entitled "Method for Determining an Entity Responsible for Billing a Called Party," which issued from an application filed Dec. 17, 2001, the disclosures of which are hereby incorporated herein by reference.

TECHNICAL FIELD

The invention relates generally to interrupt messaging and, more particularly, to techniques for using an interrupt message to interrupt transactions, such as telephony calls and/or commerce transactions, for management of an account for payment for the transactions when the transactions would otherwise be denied.

BACKGROUND OF THE INVENTION

The generation of revenue and profit is the driving force behind most business models. To supplement the cash purchasing methods in today's credit-based society, most businesses depend on some form of credit or entitlement authorization mechanism allowing for customers to purchase products, services, or other such items without the immediate physical exchange of cash. Inherent in such business models is the reality that a percentage of parties who purchase on credit or entitlement authorizations may eventually not pay, thus diminishing the business' overall profitability.

In order to balance the risk of such losses against the benefits of maintaining credit entitlement systems, businesses go to great lengths in making credit worthiness or other transaction authorization/verification determinations (collectively referred to herein as "transaction authorization determinations"), such as requiring lengthy applications including a wealth of personal information, accessing databases storing information about the potential borrower, and the like. This process is typically relatively slow and often-times results in a poor transaction authorization determination. For example, in order to minimize losses associated with poor credit risks, a transaction authorization determination implemented according to many business models may error on the conservative side, thereby foregoing a transaction having a collectable debt situation associated therewith because of a lack of information or insufficient analysis of decision criteria.

One example of a business model that requires not only that there be a transaction authorization determination made, but that such transaction authorization determinations be made very quickly, is the telecommunication provider industry. Of particular interest in such telecommunication provider transaction authorization determinations are the determinations made with respect to services provided in association with areas of relatively high volume reverse-charged and/or third-party-charged calls (referred to collectively herein as "collect calls"), where such calls tend to be associated with individuals or entities of dubious credit merit.

Telecommunication services provided with respect to controlled-environment facilities, such as prisons, is one such area of relatively high volume collect calls where the credit worthiness of the individuals involved is suspect. Prisoners are generally given some form of access to telephones, but the calls must be paid for. However, prisoners, in general, do not have ready access to cash; therefore, calls are typically made collect. As with other credit/authorization systems, some of the collect calls may never be paid for by the responsible parties, i.e., the called parties or indicated third parties. In such circumstances, the telecommunication service provider fails to recover the costs of providing the call, which, in turn, causes a loss of profitability.

Bad debt losses may sometimes reach into the tens of millions of dollars for each telecommunication service provider with the industry total well over $1 billion. To address the risk of loss on some of the attempted calls, telecommunication service providers sometimes obtain information and/or store information with respect to the called parties in order to provide call verification/authorization.

For example, when an inmate at a particular correctional facility attempts to make a collect call, the call or transaction request may go through a validation process. The telecommunication service provider may access its own customer database and/or an external database, such as a line information database (LIDB), to determine, for example, (1) can this call be billed (i.e., is there a billing arrangement with the local exchange carrier (LEC) or the called party), (2) if the destination number is already in the service provider's files, has the allotted credit limit been reached, and (3) has there been any information received from the LEC indicating that the called party has not been paying its bills. Depending on the extensiveness of the service provider's internal resources, the service provider may not be able to determine all three of these validation criteria. If favorable information is retrieved for each of the available validation criteria, the call may be completed. Conversely, if the inmate attempts to call a destination number that is not already on the customer database, or negative information is retrieved from the validation process, the service provider typically blocks the call from being completed.

While the above-mentioned blocked calls save the telecommunication provider from losses for unpaid calls, some of those blocked calls represent lost potential revenue and profit that the provider would have generated. Most solutions that have been used to address this problem have been post the first transaction. That is, when there is a telecommunications demand to a telephone number that is blocked, any mechanisms to try to obtain revenue instead of blocking future transactions, such as a customer service representative placing a call to the blocked number in an attempt to establish a business relationship, are implemented after the transaction has been blocked.

Accordingly, a need exists in the art for the making of reliable transaction authorization determinations which do not unnecessarily block transactions. Moreover, a need exists for such reliable transaction authorization determinations to be made rapidly, such as during real-time processing of a transaction.

SUMMARY OF THE INVENTION

The present invention is directed to systems and methods which provide techniques using interrupt messaging for account management. The term "account" is used generally herein to refer to any billing arrangement or business relationship by which a payor (or "customer") pays for a transaction provided by a host. In certain arrangements, an actual, funded monetary account need not exist, but instead some other billing arrangement may be employed, which is still referred to generally herein as an "account". For example, a telephony host may permit a collect call to be made to a called party, in which case the called party is considered as having an "account" of a collect-call type with the host, even though an actual monetary account is not established between the host and the called party. As another example, in some instances a payor may have a "funded" monetary account established with a host against which the host may debit bills for transactions that it hosts. In accordance with embodiments of the present invention, the interrupt messaging may be used for performing account setup, management, advertising, and transaction authorization determinations in real-time taking into consideration the quality of one or more parties to the transaction (i.e., the customer, which may include a called party, a calling party, or both in a telephony transaction) and the means by which charges may be rendered to them.

Preferred embodiments of the present invention implement transaction interrupt techniques, wherein a call or other transaction may be suspended, blocked, prefaced, and/or followed by messaging and/or interaction (e.g., via interactive voice response (IVR) and/or customer service representative), for establishing and maintaining accounts or other customer information and providing transaction authorization determinations (or to collect funds with "On Demand Invoicing"). Such transaction interrupts may be implemented for a number of reasons and at various points in a transaction according to the present invention, such as for any reason to interact with a party to the transaction, to influence a party's behavior, to provide customer care, to establish customer accounts, to manage existing customers, to advertise to one or more parties to a call, etcetera.

The interrupt messaging techniques provided herein are particularly suited for use in a controlled-environment facility. That is, embodiments of the present invention are particularly useful with respect to interrupting transactions and managing accounts associated with controlled-environment facilities, such as correctional facilities (e.g., municipal jails, county jails, state prisons, federal prisons, military stockades, juvenile facilities, and detention camps), hospitals, mental institutions, nursing homes, hotels, resorts, camps, and the like. Certain controlled-environment facilities may be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents. Transactions are often conducted by, between, among, and on behalf of the aforementioned individuals and enterprises in performing the aforementioned daily activities. Such transactions may include placing telephone calls and/or purchasing consumer goods (e.g., commissary items), as examples. Further, account management may be desired for managing an account for payment for such transactions, and the interrupt messaging techniques described herein may be used for managing an account (e.g., establishing an account, funding an existing account, and/or communicating information regarding an established account or an available alternative account, etc.).

Certain embodiments of the present invention employ such interrupts for transactions that would otherwise be denied, thus aiding in allowing more of the transactions to be completed. For instance, a resident of a controlled-environment facility may attempt to place a collect call to a called party, and the called party may deny the call (i.e., refuse to accept the charges for the collect call); in such a case, the denial of the collect call may trigger an interrupt message to be played to the called party and/or the resident. For example, an interrupt message may be played to the resident to offer the resident an option to attempt the call with a different payment arrangement (e.g., to attempt the call with billing the call to a pre-funded account of the resident). As another example, an interrupt message may be played to the called party inquiring as to whether the called party would like to establish a different type of account, such as a pre-funded account, to which the call (and/or future calls from the resident) may be billed at a discounted price compared to that of the collect call.

According to embodiments of the present invention, interrupt messaging may be employed not only for a first transaction, such as an initial transaction of a resident of a controlled-environment facility, but also for later transactions. For instance, if a new resident of a controlled-environment facility attempts to conduct a transaction, interrupt messaging may be employed to establish an account for the new resident for payment of the attempted and/or future transactions. In accordance with certain embodiments, the attempted transaction that is not authorized (e.g., because the new resident does not yet have an established account for payment) may be permitted for a threshold duration of time before the interrupt messaging is invoked to interrupt the transaction. For example, a new inmate of a prison facility may be permitted to complete a telephone call to a relative, which is not authorized because the inmate does not yet have an established account for payment for the call). In this way, the inmate may be able to inform the relative of his incarceration before the interrupt messaging interrupts the call and provides the relative instructions and/or an opportunity to establish an account for payment for continuing the call and/or for future calls. Of course, the interrupt messaging may be employed to inform the resident and/or the called relative that the call is being permitted (e.g., as a courtesy) for a threshold duration only and that instructions for continuing the call and/or making future calls will follow at the end of the threshold duration, wherein a second interrupt message is used at the end of the threshold duration to instruct one or both of the parties as to how to establish an account for payment for continuing this transaction and/or conducting future transactions.

Further, interrupt messaging may be employed even after an account has been established for a resident of a controlled-environment facility. For instance, interrupt messaging may be employed to inform a resident and/or payor of the balance of an established account and/or provide an opportunity to fund the account. Further, in certain embodiments, if the account balance is too low to support a transaction, the transaction (which is unauthorized because the account balance is too low) may be permitted for a threshold duration of time, and interrupt messaging is then invoked to interrupt the transaction and instruct one or more of the parties as to how to fund the account in order to continue the transaction and/or conduct future transactions.

As a further example, interrupt messaging may be employed to notify one or more of the parties of promotions, alternative account options that may be available to the parties, and/or other information. For instance, a resident of a controlled-environment facility may be permitted to place a collect call to a relative, and interrupt messaging may be used to inform the resident and/or the called relative that a prepaid account may be established for payment for future calls, wherein a discount for future transactions may be offered if the prepaid account is established.

According to one embodiment, a method comprises identifying initiation of a transaction by a resident of a controlled-environment facility. The method further comprises interrupting the transaction for interaction with at least one of the resident and a payor for the transaction. The interaction conducted during the interrupt may comprise at least one of establishing an account for payment for the transaction and funding an established account.

According to another embodiment, a method comprises establishing an account for a resident of a controlled-environment facility. The method further comprises identifying initiation of a transaction by the resident, and determining whether to interrupt the transaction. In certain implementations, determining whether to interrupt the transaction may be based at least in part on information about the established account, such as based on the following: the type of the account (e.g., whether it is a prepaid account, etc.), whether an alternative account is available, and/or the balance in the account. When determined to interrupt the transaction, the method further comprises interrupting the transaction and interacting with at least one of the resident and another party. The interacting may comprise at least one of the following: providing information to at least one of the resident and the another party, requesting at least one of the resident and the another party to fund the account for the resident, and providing to at least one of the resident and the another party an option to establish an alternative account for the resident.

According to certain embodiments, a method comprises establishing an account for a resident of a controlled-environment facility. The method further comprises identifying initiation of a transaction by the resident, and determining whether to interrupt the transaction. In certain implementations, determining whether to interrupt the transaction may be based at least in part on whether the initiated transaction is denied. For instance, the initiated transaction may be requested to be paid via a first type of account (e.g., a collect call), and the transaction may be denied (e.g., the collected call may not be accepted by a called party). The initiated transaction may be denied by one of the parties to the transaction, such as denial of a collect call by a called party, or the initiated transaction may be denied by a transaction processor (e.g., call processing system of the controlled-environment facility) due, for instance, to an unacceptable risk score determined for one or more of the parties (e.g., the called party) to permit the transaction to be completed via the first type of account. When determined that the initiated transaction is denied, the method further comprises interrupting the transaction and interacting with at least one of the resident and another party. The interacting may comprise at least one of the following: providing information to at least one of the resident and the another party, requesting at least one of the resident and the another party to fund the account for the resident, providing to at least one of the resident and the another party an option to establish an alternative account for the resident, and providing to at least one of the resident and the another party an option to complete the transaction with billing of the transaction to be via a second type of account. Thus, for instance, if the initiated transaction is a collect call from a resident to a called party and the called party denies the collect call; then, if the resident has a pre-funded account, the interrupt messaging may be employed to offer the resident an option to complete the call with charges for the call to be billed to the resident's pre-funded account.

According to another embodiment, a method comprises establishing a business relationship between a host and a payor. Such business relationship may be a prepaid account funded by the payor for goods/services provided by the host (e.g., to a resident of a controlled-environment facility). The method further comprises identifying initiation of a transaction by a resident of a controlled-environment facility, wherein the transaction is hosted by the host. The method further comprises determining whether to interrupt the transaction, and when determined to interrupt the transaction, interrupting the transaction and interacting with at least one of the resident and the payor. The interacting may comprise providing to at least one of the resident and the payor an option to establish an alternative account for the resident.

According to another embodiment, a system comprises a transaction processor communicatively coupled with at least one of a resident of a controlled-environment facility and a payor, wherein the resident initiates a desired transaction via the transaction processor. The system further comprises a transaction validation engine for interaction with the transaction processor in response to initiation of the desired transaction. The transaction validation engine comprises an account maintenance system for maintaining a business relationship between a host to the transaction and the payor when a current status indicates the business relationship needs maintenance. For instance, the transaction processor can interrupt the desired transaction when the transaction validation engine determines that the account maintenance is needed.

According to yet another embodiment, a method comprises identifying initiation of a transaction between a resident of a controlled-environment facility and another party, and determining whether the transaction is authorized. When determined that the transaction is not authorized, the method further comprises permitting the transaction for a threshold duration of time, and interrupting the transaction for interaction with at least one of the resident and the another party. The transaction may not be authorized because of denial by the called party or denial by a transaction processing system. For example, the transaction may be a collect call from the resident to a called party, and the called party may deny the collect call (i.e., refuse to accept charges for the call); in certain embodiments, the resident may be connected to the called party to allow them to talk for a threshold duration of time, and then the call may be interrupted to inquire as to whether the called party would now like to accept the charges for the call or whether the resident would like to use another billing arrangement (e.g., bill the call to a pre-funded account, etc.). If the call is still denied, then it may be terminated; otherwise, the specified billing arrangement may be used to allow the call to continue.

As described further herein, embodiments of the present invention are directed to systems and methods which provide techniques providing account setup, management, and transaction authorization determinations in real-time taking into consideration the quality of one or more parties to the transaction (i.e., the customer, which may include the called party, the calling party, or both) and the means by which charges may be rendered to them. According to preferred embodiments, there are number of ways that charges may be rendered to a party to a transaction, such as on a prepaid basis, through an existing business relationship, or through direct billing. Each one of these charge rendering alternatives may have different bad debt risks associated therewith and targeted populations to which they are directed. Embodiments of the present invention have the ability to understand the quality of a party to the transaction, make determinations with respect to charge rendering alternatives available with respect to the party (e.g., whether or not a valid billing address is available), and evaluate which charge rendering alternative to implement with respect to the party (e.g., whether a prepaid or a post paid product is to be implemented), all in real-time.

Transaction authorization determinations are made according to embodiments of the present invention using a hierarchy of decision criteria, to facilitate conducting transactions which might otherwise be blocked or prevented. According to embodiments of the present invention, a real-time decision tree is implemented with respect to the hierarchy of decision criteria to allow transactions, such as collect calls, commissary based transactions, etcetera, meeting at least some minimal risk threshold to be completed on a first attempt, even where a pre-arranged billing agreement or other business relationship is not in place.

An embodiment of the present invention provides a hierarchy of decision criteria in which a primary transaction authorization determination is made, followed by one or more transaction authorization determinations if the primary transaction authorization determination is negative. For example, collect calls being placed to a dialed number associated with a competitive local exchange carrier (CLEC) or other entity having no billing agreement with a telecommunication service provider initiating the call may result in a negative determination being made by a primary transaction authorization determination. However, such collect calls may be authorized by implementation of a secondary transaction authorization determination of an embodiment of the present invention, provided the called number otherwise meets some threshold risk assessment. Charges associated with such calls may be billed using a direct bill from the telecommunication service provider to the called party, with the confidence that the called party meets a target credit risk threshold.

According to embodiments of the present invention, a transaction may be completed, or partially completed, even where a primary and/or a secondary transaction authorization determination result in a negative determination, such as in an attempt to demonstrate a need for the offered transaction and/or to facilitate a business relationship suitable for conducting further transactions in the future. For example, collect calls being placed to a dialed number associated with a CLEC or other entity having no billing agreement with a telecommunication service provider initiating the call and for which the called party does not meet a desired threshold of risk may result in a negative determination being made by a primary and secondary transaction authorization determination. However, such calls may be completed or a message delivered from a caller, whether at no charge or charged as originally attempted, for a controlled amount of time to allow communication between the called and calling parties and thereby establish the need for additional calling services. The called party in such a situation may be solicited to establish a business relationship, such as by creating a pre-paid account, with the telecommunication service provider initiating the call. Subsequent calls to the called party and/or by the calling party may be permitted according to the aforementioned business relationship. Again, the interrupt message techniques described herein may be employed for an initial transaction (e.g., an initial transaction initiated by a new resident of a controlled-environment facility) and/or may be employed for a later transaction.

According to certain embodiments, the account management system may dynamically switch a party from one type of account to another type of account. For instance, friends and family members of a prisoner which have direct billing or LEC billing types for calls with the prisoner may be switched to pre-pay billing in real-time. For instance, if funds are added to a prepaid account for a prisoner, the account management system may dynamically change the account type for the prisoner from LEC/Direct billing to prepaid. The account type may then remain prepaid for as long as prepaid funds are available in the pre-established prepaid account. When the prepaid funds are depleted, the account management system may dynamically change the account type for the prisoner back to the original account type (e.g., direct billing or LEC billing). If a call is in progress and the prepaid funds are depleted (i.e., the prepaid account balance reaches $0), the account management system may enable the call to continue and apply the charges incurred after the depletion of the prepaid account to the original account type (e.g., direct bill or LEC bill). Of course, the interrupt messaging techniques described herein may be employed to inform the called and/or calling parties of the depletion of the prepaid account, and the parties may be provided an opportunity to fund the prepaid account if so desired.

Customer quality and scoring criteria may be considered by the account management system in dynamically deciding when to change the account type to employ for a prisoner (e.g., whether to require prepaid, or whether to permit direct billing, LEC billing, or some other account type). However, if a customer (e.g., a called party) has a score that qualifies for an account type other than prepaid, such customer may be permitted to conduct a call with a prisoner via the account type for which he qualifies if a prepaid account is depleted. That is, in certain embodiments, if a prepaid account is established for a prisoner, the prepaid account is used for payment for calls even with parties who qualify for another type of account, but if the prepaid account is depleted, the call with such a qualifying party may be permitted by the account management system to continue with charges being billed via another type of account for which the party qualifies (e.g., direct billing, LEC billing, etc.).

In certain embodiments, interrupt messaging may be employed to offer the parties an option of which accounts to employ for services rendered during a given transaction. For instance, if a prisoner has a prepaid account established and calls a party having a score that qualifies the called party for another type of account (e.g., direct billing), the account management system may generate an interrupt message to offer the prisoner or the called party an option of whether to utilize the prepaid account or another type of account for which the party qualifies. The system may offer a discounted rate for utilization of the prepaid account, which may encourage the called party to utilize the prepaid account first, and once the prepaid account is depleted the charges incurred thereafter, if any, may be charged to the other type of account for which the called party qualifies (e.g., direct billing).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 9 shows an exemplary block diagram of a system for enabling a resident to select an alternative preferred type of account for billing of an initiated call according to one embodiment of the present invention.

DETAILED DESCRIPTION OF THE INVENTION

Figure 1:
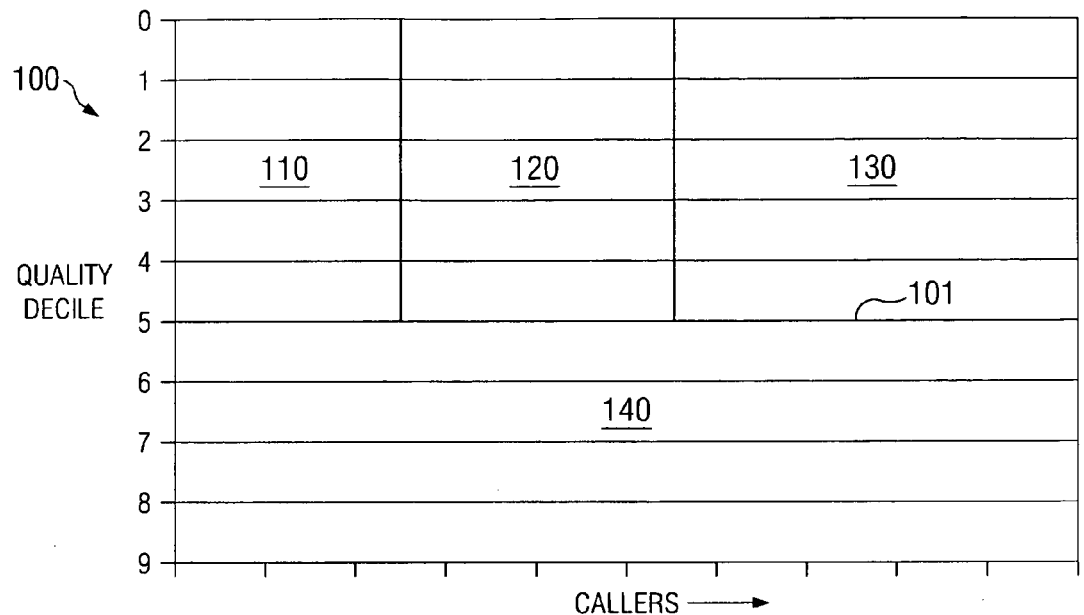
FIG. 1 shows a diagram illustrating call attempts as may be experienced in a day in association with a particular facility.

Various filters or decision criteria may be implemented with respect to making a transaction authorization determination. For example, filter criteria that may be utilized in making a transaction authorization determination with respect to a call attempt is a line information database (LIDB) query providing responsive information with respect to a dialed or destination telephone number. LIDB is a federally-managed database local exchange carriers (LECs) populate with a variety of data, such as telecommunication service provider, service profile, name and address, and credit card validation information. It should be noted that for purposes of this disclosure, LEC is intended to include not only local exchange carriers, but also CLECs, inter-exchange carriers (IXCs), and the like.

According to a typical scenario, a LIDB query response may be translated into an affirmative or negative result, such that a negative LIDB response results in completion of the call being prevented. However, the LIDB response alone, may not always provide an accurate indication with respect to the collectability of telecommunication debt.

There may be any number of reasons that a LIDB response is negative with respect to a call attempt. For example, the dialed number may not be a legitimate telephone number, such that the LIDB query cannot identify useful data records associated therewith. The dialed number may be associated with a number for which collect calling services are not typically allowed by a telecommunication service provider, such as cell phones, pagers, or other numbers a LEC has implemented specific restrictions with respect to the telephone line. For example, telephone lines with only basic services are often installed in the inner city or other areas, primarily for safety reasons, which do not provide for long distance and collect calling.

Another of the filter criteria that may be utilized in making a transaction authorization determination with respect to a call attempt is whether or not a billing agreement or other business arrangement is available between telecommunications service providers, such as the telecommunication service provider associated with the calling party and the telecommunication service provider associated with the called party. This type of transaction authorization filter criteria may be referred to as an operating company number (OCN) deny, and are often associated with a CLEC. For example, in providing collect calls, the service provider typically sends the collect call bill to the LEC that services the called number for collection. LECs, such as Southwestern Bell, Verizon, BellSouth, Ameritech, and the like generally maintain accurate billing, name, and address (BNA) information, and may be authorized to bill third-party-provided telecommunication services if billing arrangements exist. However, CLECs often provide local service without extending billing agreements to anyone for any reason outside of their own services. Accordingly, when a collect call is attempted to a customer of such a CLEC, the call may be prevented from being completed because the telecommunication service provider initiating the call is unable to bill to the CLEC.

Yet another of the filter criteria that may be utilized in making a transaction authorization determination with respect to a call attempt is relationship history. For example, based upon previous calling transactions, information may be available to the telecommunications service provider initiating the call useful in making a transaction authorization determination with respect to the called party. Such information may be that a previous call attempt has been blocked with respect to the called number because of some abnormal activity (e.g., detection of fraudulent calling attempts or invoking unallowed services such as three-way calling or remote call forwarding), the called number is experiencing an unusually high velocity of collect calls, a credit limit or ceiling has been reached with respect to the called party, etcetera. Historical information may be analyzed not only with respect to a called party, but information with respect to a calling party may be utilized as filter criteria. For example, even where a calling party station is shared, unique identifiers such as personal identification numbers (PINs) and/or bio-signatures (e.g., voice prints, finger print vectors, iris scan vectors, and the like) may be used to identify a calling party. The calling party information may be used to reference a database for historical information with respect to that party and/or transactions conducted thereby. For example, although a current called party meets other filter criteria, the calling party may have a history of uncollectable transactions associated therewith, thereby suggesting that a current call attempt should be declined.

Traditionally, call processing systems have blocked a call attempt if any of the transaction authorization determination filter criteria, such as those set forth above, resulted in a negative determination. That is, the call attempt would be analyzed according to the pre-established filter criteria and, if any aspect of the call analyzed did not meet the filter criteria the call would not be completed and further processing with respect to that call attempt stopped.

Experience has shown, however, that in some situations, such as where calling services are provided with respect to a prison facility, very large numbers of calls (and thus sources of revenue) may be blocked by more traditional filter criteria. For example, on the order of 30-50% of unique called telephone numbers might be denied service at a single facility.

Accordingly, embodiments of the present invention provide for further processing of transactions, such as by implementing transaction interrupt techniques, to facilitate completion of transactions even where filter criteria otherwise provides negative indications with respect to the transaction. Such transaction interrupts may be utilized according to the present invention to analyze customers and their needs, to target appropriate products (e.g., calling and account services) to the customers, to demonstrate a need for services, to establish an appropriate business relationship with customers, to maintain and manage customer business relationships (perhaps altering the business relationship when particular situations or activities are detected), and the like.

As one example, if a resident of a controlled-environment facility attempts a transaction that is to be billed via a first type of account (e.g., a telephone call that is placed as a collect call) and such transaction is denied (e.g., based on a filter criteria and/or the called party denies the collect call), certain embodiments of the present invention utilize interrupt messaging to afford the resident an opportunity to complete the call using another type of account. Suppose, for example, that a pre-funded account is established for a resident of a controlled-environment facility. Further suppose that the resident attempts to place a collect call to a called party, and the called party denies the call (i.e., refuses to accept charges for the collect call). The called party may, for example, be the person funding the pre-funded account, and does not desire to incur further expenses than those deposited in the pre-funded account (and, thus denies the collect call). The telephone service provider for the controlled-environment facility would, however, desire to complete the call since funds for the call are available in the resident's pre-funded account, rather than denying the call altogether. Therefore, according to one embodiment of the present invention, an interrupt message is used responsive to the denied collect call to provide the resident with an opportunity to complete the call with the charges for the call being paid via the resident's pre-funded account. Thus, the call that would otherwise be denied can be completed, resulting in improved revenue to the telephone service provider.

In certain embodiments, upon detecting that the resident is initiating a collect call, the system may determine whether a pre-funded account (or other alternative account) is available for use by the resident, wherein an interrupt message may be used to provide the resident with the option of completing the call to be billed via the pre-funded account (or other alternative account) rather than continuing with it as a collect call. It may be more desirable to the telephone service provider to encourage the resident to use one type of account, such as a pre-funded account, over another type of account, such as collect calling in which the charges for the call are to be collected from the called party after the call is completed. Thus, the resident may have the option of how to attempt to place the call with the corresponding billing arrangement that is available. Accordingly, in certain embodiments, the interrupt messaging may be used to provide the resident with an option of an alternative account that may be used for a given initiated call (e.g., initiated collect call) before such initiated call is denied (e.g., before a called party denies the collect call). Of course, the interrupt messaging may again be used, as mentioned above, if/when the call is denied.

The systems and methods of the above referenced patent applications entitled "Optimizing Profitability in Business Transactions" and "System and Methods for Offering a Service to a Party Associated with a Blocked Call" provide further processing with respect to a call attempt which does not otherwise meet one or more filter criteria. Specifically, the systems and methods disclosed therein provide for further processing with respect to a call attempt to thereby contact a called party for which a call attempt has been blocked in an attempt to establish a business relationship therewith. For example, a telecommunications service provider which has blocked a call, such as one having been placed from an inmate at a prison facility to a friend or family member outside of the prison facility, may call the number dialed by the calling party, stating that a call attempt has been blocked from a particular location and ask that a pre-paid account be established, that billing information be provided, that credit card information be given, and/or the like in order for the called party to receive such calls in the future.

Embodiments of the present invention provide further processing with respect to a call attempt which does not otherwise meet one or more filter criteria by providing transaction authorization determinations in real-time which take into consideration the quality of one or more parties to the transaction (i.e., the customer, which may include the called party, the calling party, or both) and the means by which charges may be rendered to them. Preferably, transaction interrupt techniques, wherein a call or other transaction may be suspended, blocked, prefaced, and/or followed by messaging and/or interaction (e.g., via IVR and/or customer service representative), are implemented with respect to establishing and maintaining accounts or other customer information and providing transaction authorization determinations.

Preferred embodiments of the invention make transaction authorization determinations using a hierarchy of decision criteria, to facilitate conducting transactions which might otherwise be blocked or prevented. For example, a real-time decision tree may be implemented with respect to a hierarchy of decision criteria to allow transactions, such as collect calls, meeting at least some minimal risk threshold to be completed on a first call attempt, even where a pre-arranged billing agreement or other business relationship is not in place. As another example, such decision tree may be utilized to allow transactions to be completed when a pre-established billing agreement (i.e., an account) is in place, but is in need of funding or other maintenance and/or a different billing arrangement is now desired or required (e.g., based on the customer's "quality" score, etc.). For instance, over time a customer's score may increase or decrease, and as a result, different billing arrangements may become available or be required. For example, as a customer's quality score improves, he may qualify for a different type of account (e.g., a different billing arrangement) and/or different billing rates for the transactions. Similarly, as the customer's quality score worsens, he may be required to establish a different type of account (e.g., a prepaid account may be required).

Quality determinations with respect to parties to a transaction may be made in a number of ways according to the present invention. For example, parties may be rated on a scale of 10, referred to herein as deciles with decile zero being the highest quality customer (low bad debt risk) and decile 9 being the lowest quality customer (higher bad debt risk), based upon various information which may be collected about the party, the location of the party, the historical transaction patterns of the party, etcetera.

For example, a quality metric with respect to a called party may be derived from information with respect the called party's LEC payment history, the location of the called party, the length of time the called party has had service, the features of the called party's service, the frequency of calls received from a facility or facilities, etcetera. A quality metric with respect to a calling party may be derived from information with respect to the length of time the calling party has stayed or is to stay at a facility from which the call is placed, the behavior or activity of the calling party at the facility from which the call is placed, the calling party's historical call activity such as may include frequency of calls, quality of called parties called by the calling party, the criminal or other history of the calling party, etcetera. Details with respect to implementing customer quality analysis and determination systems and methods are shown and described in the above referenced patent application entitled "Optimizing Profitability in Business Transactions." The techniques disclosed therein are utilized according to preferred embodiments of the present invention in analyzing and making determinations with respect to quality of a party to a transaction. Details with respect to information associated with a calling party as may be utilized in deriving a quality metric according to embodiments of the present invention are shown and described in the above referenced patent application entitled "Information Management and Movement System and Method."

Of course, the quality rating of a customer may change over time, and thus a new billing arrangement may be made available or be required for customer. Interrupt messaging may be used, in accordance with embodiments of the present invention, to interact with a customer for notifying the customer of a new billing arrangement (i.e., account) that is available or required, and/or for establishing such a new billing arrangement.

Experience has shown that, when implementing a customer quality decile rating technique according to a preferred embodiment, in most cases the distribution of call demand is substantially equally distributed. That is, approximately 10% of call demand falls within each decile. Moreover, analysis has revealed that, in those situations for which blocked calls have been further analyzed in development of the present invention, a large number of calls associated with a party to the transaction having a high customer quality rating were being blocked using filter criteria as described above. Accordingly, revenue opportunities have been recognized and addressed with respect to relatively high quality customers as well as relatively low quality customers which otherwise fail one or more filter criteria according to embodiments of the present invention.

Directing attention to FIG. 1, a diagram showing an example of call attempts as may be experienced in a day in association with a prison facility are shown. Specifically, box 100 represents the total number of call attempts in a day from a particular facility, wherein the horizontal axis represents a number or quantity of call attempts (it being appreciated that the illustrated hash marks are exemplary and not intended to represent any particular number or percentage of call attempts) and the vertical axis represents the quality decile associated with each particular call attempt. Area 110 represents those call attempts that meet primary call authorization determination filter criteria and, therefore, may be completed according to typical call processing implementations. Areas 120, 130, and 140 represent those call attempts that fail one or more filter criteria and, therefore, may be blocked according to more typical call processing implementations.

For example, area 120 may be associated with call attempts which, although a party thereto meets desired customer quality criteria and for which valid BNA information is available, the telecommunication service provider associated with the called party does not have a billing agreement in place with the telecommunication service provider associated with the calling party. Area 130 may be associated with call attempts which, although a party thereto meets desired customer quality criteria, the telecommunication service provider associated with the called party does not have a billing agreement in place with the telecommunication service provider associated with the calling party and no valid BNA information is available. Line 101, associated with decile 5 in the illustration, represents a filter criteria of a primary call authorization determination, such that if the customer quality associated with a party to the call is below this line (having a higher decile), the primary call authorization determination would result in a negative determination. Accordingly, area 140 may be associated with call attempts which, irrespective of any agreement in place between the telecommunication service provider associated with the called party and the telecommunication service provider associated with the calling party and/or the availability of BNA information, no party thereto meets desired customer quality criteria. As can be seen in FIG. 1, areas 120, 130, and 140 represent an appreciable amount of call attempts that, according to more typical call processing techniques, would be blocked and, therefore, the revenue associated therewith foregone.

In addressing the various reasons for a call attempt failing a primary call authorization determination, embodiments of the present invention provide a bifurcated or decision branching approach to further processing of transaction attempts. Because the transaction closing rate with respect to the aforementioned technique of post transaction blocked call processing, wherein a number for which a call attempt has been blocked is contacted for an opportunity to establish a business relationship, is often times disappointingly low, embodiments of the present invention present alternatives implemented in real-time when a transaction attempt results in a negative primary transaction authorization determination.

Accordingly, embodiments of the present invention will preferably initially make a determination as to whether a transaction attempt meets primary filter criteria, such as criteria for allowing a collect call to be billed through the called party's LEC (e.g., the call attempt falls into area 110 of FIG. 1). If the primary filter criteria are met, the transaction may be allowed to be completed and the transaction dealt with through conventional channels.

However, if the primary transaction authorization determination results in a negative determination, but the called party is otherwise associated with at least a minimum level customer quality, preferred embodiments of the present invention operate to determine in real-time if BNA or similar billing information is available to facilitate the telecommunication service provider associated with the calling party to direct bill the called party (e.g., the call attempt falls into area 120 of FIG. 1). If this secondary transaction authorization determination provides an affirmative determination, the transaction may be allowed to be completed and the transaction billed directly by the telecommunication service provider. According to this embodiment, if a called party is within a certain customer quality, and reliable information is available with respect to a billing name and address, where historically that transaction would have been blocked, the transaction will be completed during the first attempt.

However, if the secondary transaction authorization determination results in a negative determination (e.g., the call attempt falls into areas 130 or 140 of FIG. 1), preferred embodiments of the present invention operate in real-time to demonstrate a need for transaction services to the called party. For example, a preferred embodiment of the present invention may implement a transaction interrupt technique which allows a qualified transaction to be conducted, such as to allow a call to be completed for a limited period of time, such as less than 1 minute, to allow the called party and calling party to converse, possibly at no charge to either party. The calling party may, during this call period, explain to the called party the situation and therefore demonstrate a need for additional calling services. Alternatively, embodiments of the present invention may implement a transaction interrupt technique which allows the calling party to record a message of limited duration, such as less than 1 minute, to allow a call processing system to contact the called party and play the message to demonstrate the need for calling services.

The present invention may provide instructions in association with the aforementioned qualified transaction for the called party to establish a business relationship with the service provider or other host to the transaction, or otherwise provide information in order to prevent future transaction attempts from being blocked. For example, the called party, if otherwise associated with at least a minimum level customer quality, may provide BNA information to allow direct billing for such services. Additionally or alternatively, the called party may establish a prepaid account, such as by providing credit card information to a customer care agent or providing a check image via the Internet, to allow debiting for such services.

The aforementioned business relationships may facilitate the provision of such services as telephone communications, whether to or by a particular party or parties. For example, an account may be established to allow a particular prison inmate to place phone calls from the prison facility in which they are incarcerated. Additionally or alternatively, an account may be established to allow calls from a particular prison facility to be made to a particular party residing outside of the prison facility. Moreover, business relationships established and maintained according to embodiments of the present invention may facilitate the provision of services in addition to or in the alternative to telephone communications, such as to facilitate the purchase of goods, whether by or for a particular party or parties. For example, an account may be established to allow a particular prison inmate to purchase commissary goods, preferably using a call processor adapted according to the present invention to order such goods, for their own use and/or for delivery to others (perhaps even parties residing outside of the prison facility). Similarly, an account may be established to allow a party residing outside of a prison facility to purchase commissary goods, preferably using a call processor adapted according to the present invention to order such goods, for delivery to prisoners incarcerated within a particular prison facility.

The aforementioned interaction between the calling party and the call processor as well as the interaction between the called party and the call processor may be under control of a human operator, or other customer service representative, placed in communication with one or more of these parties. However, preferred embodiments of the invention implement IVR technology to automate such interaction. Accordingly, embodiments of the present invention may provide a substantially "no-touch" administration free, secure, transaction processing system providing account establishment and maintenance.

It should be appreciated that, although embodiments have been described above with reference to transaction authorization determinations and transaction interrupts made with respect to initial call attempts, the concepts of the present invention are applicable to other transaction situations as well. For example, although a particular call may be completed based upon a particular transaction authorization determination, aspects of the present invention may be implemented in response to detecting fraud activity or other undesired behavior. With respect to prison facility calling services, call behavior such as automatic call forwarding and three-way calling with respect to a completed call as well as high call velocity (a relatively large number of calls in a short period of time) with respect to a particular called party are highly indicative of resulting bad debt. Accordingly, a transaction interrupt technique may be implemented in which calls in process may be released with respect to one party to the call, such as the calling party, keeping a link to the other party to the call to offer an appropriate product to them, such as a prepaid account, to allow further calling services.

The interrupt techniques provided herein may be employed to initially establish an account for a resident of a controlled-environment facility, such as a prison, and/or to conduct maintenance on an account (e.g., fund the account), and/or to offer an alternative account (e.g., a pre-paid account may be offered, and the host may offer a promotional discount for establishing such a prepaid account). The interrupt techniques provided herein may be employed at any time for interrupting a transaction to communicate information to a resident and/or payor (e.g., regarding establishing an account, funding or otherwise maintaining an existing account, providing promotional details and/or alternative account options that are available, etc.).

As described further herein, various triggers may be defined for invoking an interrupt message. For instance, logic may be employed, such as the below-described transaction processor 210 and/or transaction validation engine 220 (see FIG. 2), which may be operable to monitor transactions and determine when a transaction should be interrupted. In certain embodiments, a system administrator may define triggers, and the monitoring logic determines whether one or more triggers are satisfied for a given transaction, wherein if a trigger is satisfied then the transaction is interrupted and a corresponding interrupt message is generated. For example, a trigger may specify that a transaction is to be interrupted if the transaction is billed to an established prepaid account and such prepaid account's balance is below a threshold amount, wherein a corresponding interrupt message may be used to inform a party (e.g., payor) of the account's balance and/or invite the party to fund the account. As another example, a trigger may specify that a transaction is to be interrupted if a party to the transaction has a quality score that has improved above a threshold amount so as to qualify for an alternative account type, wherein the corresponding interrupt message may inform the party of the alternative account type that is available and/or invite the party to establish/utilize such alternative account type. A system administrator may define any number of triggers and corresponding interrupt messages to be invoked when a trigger is satisfied.

Figure 2:
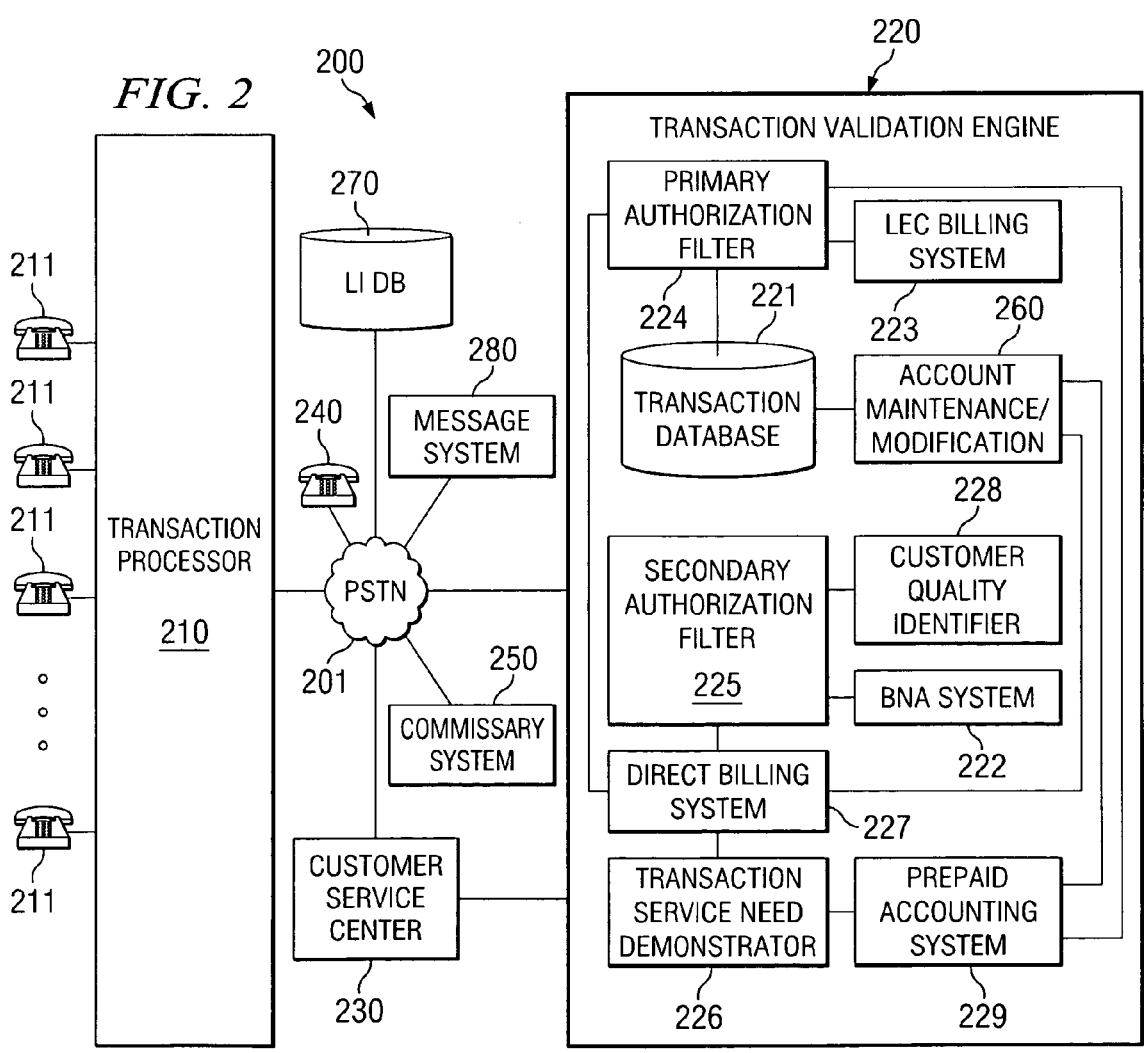
FIG. 2 shows a block diagram of a transaction system adapted according to a preferred embodiment of the present invention.

Directing attention to FIG. 2, a system adapted according to a preferred embodiment of the present invention is shown as transaction system 200. Shown in transaction system 200 are originating party stations 211 and end party station 240, such as may comprise any number of communication devices such as telephones, cellular telephones, facsimile machines, computers, personal digital assistants (PDAs), etcetera. It should be appreciated that the designations "originating party station" and "end party station" as used herein are for convenience and are not intended to set forth any limitations with respect to which stations may be utilized in initiating or otherwise conducting transactions according to the present invention.

As an example of transactions that may be provided according to the present invention, parties at originating party stations 211 may be desirous of communicating with a party at end party station 240 by placing a collect call. Additionally or alternatively, a party at originating party stations 211 may be desirous of obtaining a commissary item using commissary system 250, where such a commissary item may be for delivery to and use by the party at station 211 making an order, another party associated with originating party stations 211, or a party associated with end party station 240. Similarly, a party at end party station 240 may be desirous of obtaining a commissary item using commissary system 250, where such a commissary item may be for delivery and use by the party at station 240 or a party associated with originating party stations 211. As still a further example, a party at 240 may be desirous of leaving a message (in message system 280) for a resident of a controlled-environment facility, and such a resident may be desirous of obtaining such message from the message system (e.g., by receiving a recorded message from system 280 via station 211). When a party using station 240 is interacting with message system 280 for leaving a message, such a transaction may be interrupted in accordance with embodiments of the present invention. For instance, if the party is identified as a payor that funds a prepaid account having a balance below a threshold amount, the transaction may be interrupted to inform the party of the balance and/or to provide an opportunity for the party to fund the account. Similarly, if the resident for which the party is leaving a message is identified as having an associated prepaid account with a balance below a threshold amount, the transaction may be likewise interrupted. Further, when a resident using station 211 is interacting with message system 280 for retrieving a message, such a transaction may be interrupted in accordance with embodiments of the present invention.

Although calling services and the purchase and delivery of commissary items are specifically set forth above, it should be appreciated that transaction systems adapted according to the present invention are not limited to any particular goods and/or services. For example, a plurality of goods and services providers may be included with respect to a particular transaction system, such as florists and pharmacists, where a transaction system is deployed with respect to a hospital or medical facility, or restaurants and media providers (e.g., cable television, pay-per-view, Internet service providers, etcetera), where a transaction system is deployed with respect to a hotel or apartment facility.

Originating party stations 211 of the illustrated embodiment are coupled to the public switched telephone network (PSTN) 201 via transaction processor 210, which preferably arbitrates completion of transaction attempts in accordance with operation of embodiments of the present invention. For example, transaction processor 210 may comprise call processing apparatus disposed at a calling party location, such as at a prison facility, such as shown and described in the above referenced patent application entitled "Information Management and Movement System and Method". Of course, there is no requirement according to the present invention that a call processor be disposed as shown in FIG. 2. For example, rather than being disposed between a calling party and the PSTN, a call processor utilized according to the present invention may be coupled to a calling party via the PSTN, such as in an enhanced calling service configuration, if desired. Moreover, various of the functional aspects attributed to transaction processor 210 according to embodiments described herein may be provided by systems external thereto, such as commissary system 250, transaction validation engine 220, customer service center 230, and/or message system 280, if desired.

Although communication via the PSTN is shown in the illustrated embodiment, it should be appreciated that there is no limitation with respect to use of the PSTN according to the present invention. Accordingly, network 201 providing communication between parties and/or systems in accordance with the present invention may comprise any number of communication networks, such as a local area network (LAN), a metropolitan area network (MAN), a wide area network (WAN), a cable transmission system, the Internet, and/or combinations thereof. For example, voice communication may be provided via the PSTN while data communication is provided via the Internet. Of course, voice communication may be provided via networks other than the PSTN, such as by using voice over internet protocols (VoIP). Similarly, data communication may be provided using the PSTN and/or other networks, as desired.

Commissary system 250, transaction validation engine 220, customer service center 230, and message system 280 of the illustrated embodiment are coupled to transaction processor 210 via PSTN 201 to provide transaction authorization determinations and/or transaction processing support with respect to operation of transaction processor 210. Of course, there is no requirement according to the present invention that a transaction validation engine and/or customer service center be disposed as shown in FIG. 2. For example, any one or more of commissary system 250, transaction processor 210, transaction validation engine 220, customer service center 230, message system 280, and/or aspects thereof may be combined at a common location. Accordingly, various of the functional aspects attributed to any of commissary system 250, transaction processor 210, transaction validation engine 220, customer service center 230, and/or message system 280 according to embodiments described herein may be provided various ones of the systems of transaction system 200, if desired. Additionally or alternatively, various embodiments of the present invention may omit one or more of these aspects.

Transaction validation engine 220 of the illustrated embodiment includes primary authorization filter 224, secondary authorization filter 225, and transaction service need demonstrator 226, as may be implemented in a hierarchical transaction authorization determination technique according to preferred embodiments of the present invention. Additionally, transaction validation engine 220 of the illustrated embodiment includes account maintenance/modification system 260 as may be utilized in maintaining and/or changing accounts according to the present invention. Transaction database 221 may be utilized to store information with respect to particular transactions, accounts, and/or parties to transactions. LEC billing system 223 may be utilized in establishing, maintaining, and/or servicing accounts which are billed through a third party, such as a LEC. Customer quality identifier 228 may be utilized in determining a quality metric with respect to a party to a transaction. BNA system 222 may be utilized to identify, obtain, and/or store billing information. Direct billing system 227 may be utilized in establishing, maintaining, and/or servicing accounts which are directly billed. Prepaid accounting system 229 may be utilized in establishing, maintaining, and/or servicing accounts which are prepaid. The operation of these functional aspects of transaction validation engine 220 according to embodiments of the present invention are described in further detail herein below.

According to embodiments of the present invention, transaction processor 210 recognizes an attempted transaction to be managed according to the present invention and communicates with transaction validation engine 220. Accordingly, transaction processor 210 may contain logic to interact with a party at originating party stations 211 and/or end party station 240 to obtain transaction information or may recognize initiation of a transaction and provide a communication conduit between a party at originating party stations 211 and/or end party transaction station 240 to transaction validation engine 220 for transaction processing according to the present invention. Transaction engine 220 may operate to authorize, control, and/or facilitate transactions associated with transaction processor 210, such as by establishing accounts, managing previously established accounts, providing transaction validation determinations, and/or accounting and billing for transaction services. Transaction engine 220 may interact with other systems or parties, such as commissary system 250, database 270, customer service center 230, message system 280, and/or end party station 240, in providing the aforementioned authorization, control, and/or facilitation of transactions. Transaction validation engine 220 may interact with, or include, an IVR unit to solicit information from one or more party to a transaction. Such interaction with parties to the transaction may be via separate communication to the parties by systems of transaction system 200 or may be provided by "conferencing-in" systems of transaction system 200 to communications between the parties. Various systems of transaction system 200 may transfer communication links between one or both parties to a transaction to various systems in order to provide transaction processing as described herein.

Figure 3A:
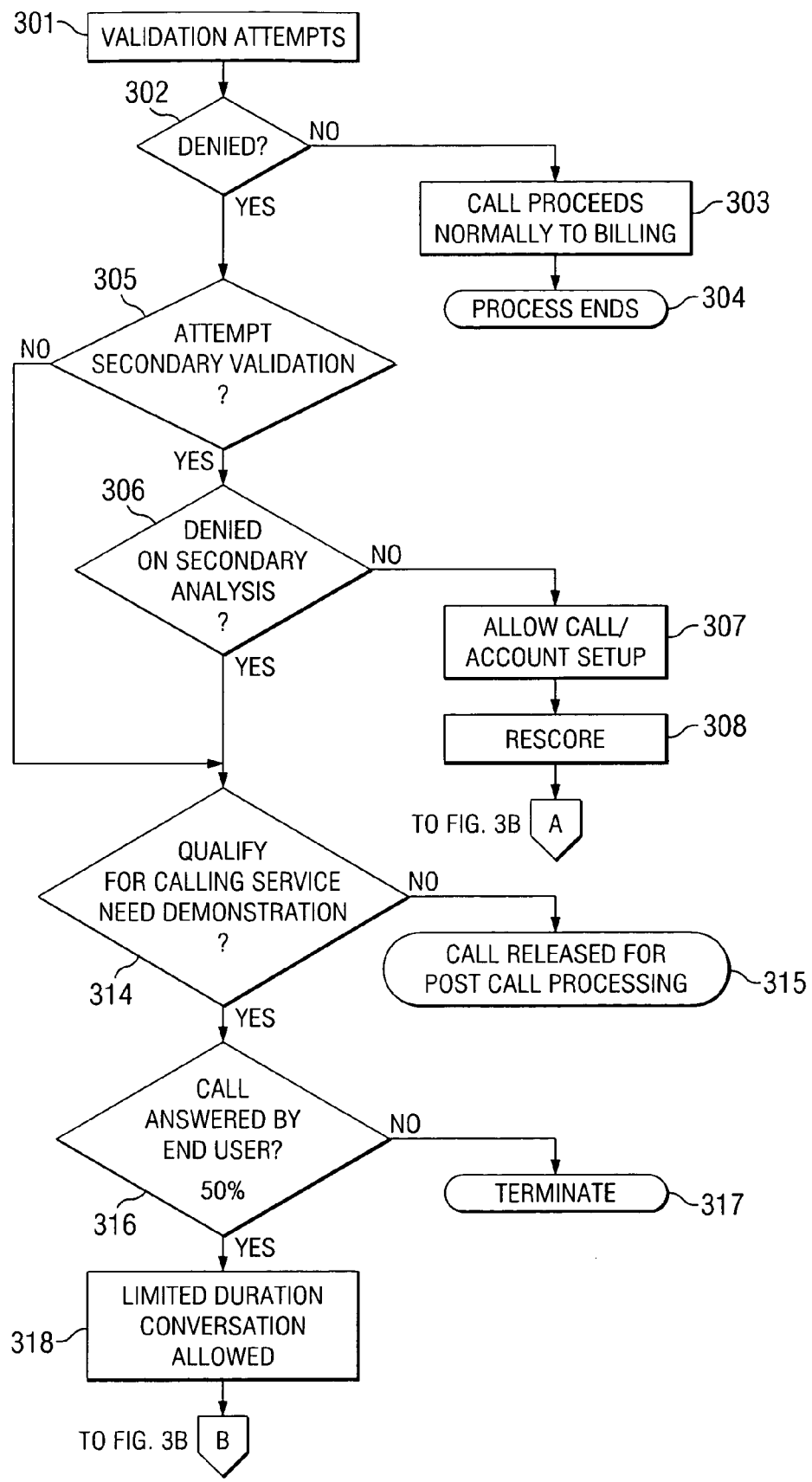
FIGS. 3A and 3B show a flow diagram of operation of the transaction system of FIG. 2 according to a preferred embodiment of the present invention.
Figure 3B:
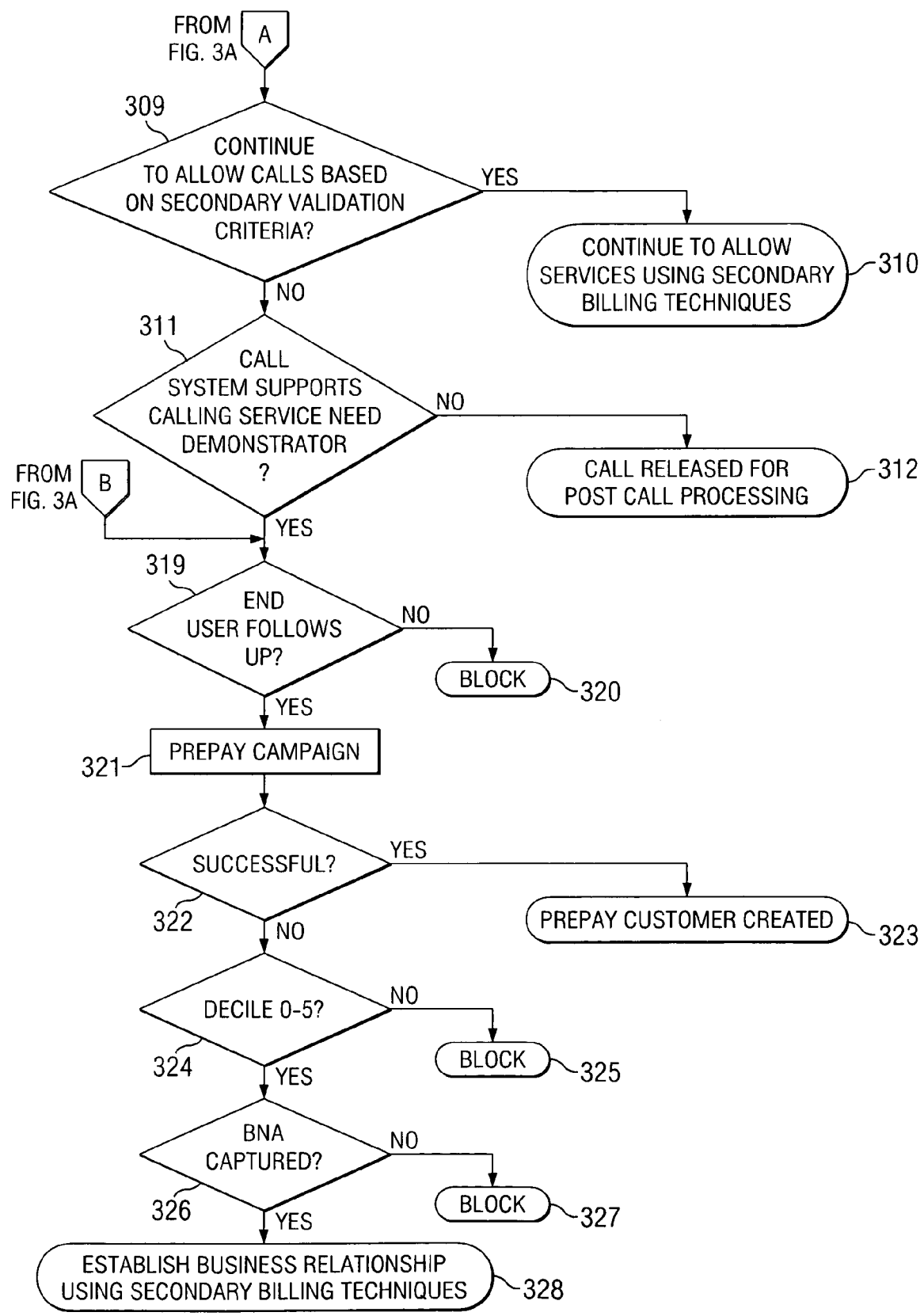

Directing attention to FIGS. 3A and 3B, a flow diagram of operation of system 200 according to a preferred embodiment of the present invention is shown. Specifically, at box 301 a call attempt is made by a party at one of originating party stations 211 with transaction processor 210 arbitrating the call attempt and attempting validation before completing the call. Accordingly, transaction processor 210 may communicate with transaction validation engine 220 via PSTN 201. Information with respect to the call attempt, such as the location of the call, the called number, identification of the calling party, and/or the like, may be provided to primary authorization filter 224 of transaction validation engine 220. Primary authorization filter 224 may operate to make a primary transaction authorization determination substantially as described above. For example, primary authorization filter 224 may access call database 221 to determine if the called party or calling party has a negative data associated therewith (such as history of nonpayment, excessive call velocity, indications of fraudulent activity or other undesired behavior, refusal to accept collect charges, request to have calls blocked, and/or the like) or positive data associated therewith (such as a prepaid account, credit card information, and/or the like) for a determination of whether the attempted call should be completed. Additionally or alternatively, primary authorization filter 224 may cause transaction validation engine 220 to issue a query to LIDB 270 for a determination of whether the attempted call should be completed. For example, a query to LIDB 270 may provide an OCN of the telecommunication service provider associated with end party station 240. This OCN may be compared to a list of OCNs having billing agreements with the telecommunication service provider associated with transaction processor 210.

At box 302 a determination is made as to whether the call should be denied, i.e., the criteria analyzed by primary authorization filter 224 results in a negative determination. If it is determined that the call should not be denied processing proceeds to box 303 wherein the call is permitted to be completed, e.g., originating party station 211 is coupled to end party station 240 via transaction processor 210 and PSTN 201, and the calling services are billed according to criteria determined by primary authorization filter 224. For example, if traditional collect calling is permitted to the called party station, LEC billing system 223 may be invoked. Alternatively, if it was determined that a prepaid account is to be used or that a direct billing arrangement has been previously established with respect to the called or calling party, such as by reference to call database 221, prepaid accounting system 229 or direct billing system 227, respectively, may be invoked. Thereafter, further call authorization determination processing may terminate at box 304.

If, however, it is determined that the call should be denied at box 302, the illustrated embodiment of the present invention proceeds to box 305 for a determination as to whether a secondary transaction authorization determination is to be made. There may be a number of factors which determine whether or not the secondary transaction authorization determination is to be made, such as whether corresponding logic is incorporated into the particular transaction processor associated with the call attempt, whether particular information (such as called party BNA information) is available, a quality metric associated with the called and/or calling party, the gross margin or revenue potential of the calling service, etcetera.

If it is determined that a secondary transaction authorization determination should be performed, processing according to the illustrated embodiment proceeds to box 306 for a secondary transaction authorization determination using secondary authorization filter 225. Secondary authorization filter 225 may operate to make a secondary transaction authorization determination substantially as described above. For example, secondary authorization filter 225 may utilize information provided by customer quality identifier 228 to determine if the called party or calling party meets a minimum risk criteria for providing direct billed collect calling. Additionally or alternatively, secondary authorization filter 225 may utilize information provided by BNA system 222 to determine if suitable billing information with respect to the called party is available for providing direct billed collect calling.

If, at box 306, it is determined that the call should not be denied, processing proceeds to box 307 wherein the call is permitted to be completed, e.g., originating party station 211 is coupled to end party station 240 via transaction processor 210 and PSTN 201, and the calling services are billed according to criteria determined by secondary authorization filter

225. For example, if it was determined that sufficient BNA information is available with respect to the called party, direct billing system 227 may be invoked. Thereafter, further call authorization determination processing may terminate. However, preferred embodiments of the present invention provide additional call authorization determination, such as to rescore the customer quality metric based upon later acquired information and/or more thorough analysis at box 308. For example, the real-time determination of a customer quality metric utilized in processing an initial call attempt may have been based upon a limited set of data available in the circumstances. To limit exposure to credit risk, subsequent quality metric analysis may be performed with respect to a particular party, such as may be made in the background during the call between the calling and called party, and the determination to allow services using secondary billing techniques may be reconsidered (box 309). If it is determined that calls based upon the secondary validation criteria should continue to be allowed, processing according to the illustrated embodiment proceeds to box 310. However, if it is determined that calls based upon the secondary validation criteria should not continue to be allowed, processing continues to box 311.

At box 311 a determination is made as to whether transaction system 200 supports operation of a transaction service need demonstrator of an embodiment of the present invention. For example, corresponding logic may not be present in transaction processor 210, transaction validation engine 220 may not have transaction service need demonstrator 226 associated therewith, customer service center 230 may not be included with respect to a particular embodiment, etcetera. If transaction system 200 does support operation of a transaction service need demonstrator, processing according to the illustrated embodiment proceeds to box 319, as is described in detail below. If, however, transaction system 200 does not support operation of a transaction service need demonstrator, processing according to the illustrated embodiment proceeds to box 312 wherein the connection between the calling and called parties is terminated in favor of post transaction processing. For example, a message may be played to the called party to provide information as to how to contact customer service center 230 to facilitate future calling services. Alternatively, customer service center 230 may be coupled to end party station 240 for facilitating future calling services. Post call processing techniques useful according to the present invention are shown and described in the above referenced patent application entitled "Systems and Methods for Offering a Service to a Party Associated with a Blocked Call."

If, at box 305, it is determined that a secondary transaction authorization determination should not be performed or if, at box 306, it is determined that a particular call attempt does not qualify for secondary transaction authorization, processing according to the illustrated embodiment proceeds to box 314 for demonstration of the need for transaction services to the called party using transaction service need demonstrator 226. Transaction service need demonstrator 226 may operate to demonstrate the need for calling services to a called party substantially as described above. For example, transaction service need demonstrator 226 may allow limited communication between the called and calling parties to allow the called party to identify who is calling, to allow the calling party to explain the situation requiring calling services, etcetera.

At box 314 a determination is made as to whether a transaction service need demonstration is to be made. There may be a number of factors which determine whether or not the transaction service need demonstration is to be made, such as whether corresponding logic is incorporated into the particular transaction processor associated with the call attempt, the call validation engine may not have transaction service need demonstrator logic operable with respect thereto, a customer service center may not be included with respect to a particular embodiment, etcetera. If a transaction service need demonstration is not to be made, processing according to the illustrated embodiment proceeds to box 315 wherein the call attempt is denied and post transaction processing is performed. For example, a message may be played to the called party to provide information as to how to contact customer service center 230 to facilitate future calling services. Alternatively, customer service center 230 may be coupled to end party station 240 for facilitating future calling services.

However, if it is determined, at box 314, that a transaction service need demonstration is to be made, processing according to the illustrated embodiment proceeds to box 316. At box 316 the attempted call is allowed to be placed to the called party and a determination is made with as to whether end party station 240 is answered. If the call to end party station 240 goes unanswered, then processing according to the illustrated embodiment proceeds to box 317 wherein the call is terminated. It should be appreciated that termination at step 317 may invoke post transaction processing, such as that described above with respect to box 315, if desired.

If, at box 316, it is determined that end party station 240 has been appropriately answered (e.g., end party station 240 goes off hook, a particular identified individual or individual meeting a requirement such as age or competency answers end party station 240, and/or the like), processing preferably proceeds to box 318 wherein a conversation between the called and calling parties is allowed for a limited time. For example, a courtesy call (i.e., neither the called nor the calling party are charged for the calling service) lasting on the order of 40-50 seconds may be allowed, perhaps preceded and/or followed by an announcement as to the fact that the call is a courtesy call and providing instructions as to how future calls may be facilitated (e.g., through establishment of a prepaid account, etc.). Alternatively, a message may be recorded from the calling party for replay to the called party, or a one-way communication link established from the calling party to the called party, to allow the calling party to communicate a need for calling services and/or for the called party to identify the calling party, without establishing two-way communication between the calling and called parties. Preferred embodiments of the present invention limit such courtesy calls or communications to approximately 40 seconds to keep the telecommunication costs associated therewith under one minute, which is typically the billing increment, and because experimentation has shown that this length of communication provides sufficient time for the parties to establish that a need for communication services exists but insufficient time to exhaust additional demand for service. It should be recognized that the above-mentioned courtesy calls may be allowed upon an initial call (e.g., made by a new resident of a controlled-environment facility), or upon a later call in which an account exists but insufficient funds are available in the account, as examples.

At box 319 a determination is made as to whether the called party has responded to the call demonstrating a need for calling services. For example, prior to being disconnected, the called party may be instructed to speak or dial a response indicating they would like to facilitate future calling services and thereafter connected to an IVR or live agent for further processing. Alternatively, the called party may be given a contact number (e.g., telephone number and/or e-mail address) of a customer service center to contact in order to facilitate future calling services. If, at box 319, it is determined that the called party has not responded to the call demonstrating a need for calling services, processing according to the illustrated embodiment proceeds to box 320 wherein future call attempts to the called party number are blocked. For example, call database 221 may be updated to reflect that transaction validation engine 220 should deny future call attempts.

However, if it is determined at box 319 that the called party has responded to the call demonstrating a need for calling services, processing preferably proceeds to box 321 were the called party is placed in communication with customer service center 230 to facilitate future calling services, e.g., establishment of an account and identification of the transactions and/or parties for which the account is to be utilized. It should be appreciated that customer service center 230 may comprise an automated system, such as an IVR unit, and/or live operators to interact with a party in facilitating calling services according to the present invention.

At box 321, customer service center 230 may attempt to establish a prepaid account for providing future services, such as calling services, purchase of commissary items, etcetera. For example, deposit of funds to a cooperating field office, such as a Western Union office etcetera, may be solicited. Additionally or alternatively, credit card information may be taken to provide for guaranteed payment of services. It should be appreciated that such prepaid accounts may be associated with a particular calling party, a particular called party, or combinations thereof, irrespective of the party establishing the prepaid account, as authorized by the party establishing the prepaid account. Additionally or alternatively, the prepaid account may be utilized to facilitate transactions other than the aforementioned calling services. For example, a prepaid account of the present invention may be utilized with respect to commissary transactions by an inmate in a prison facility. In certain embodiments, the called party may be offered or required (e.g., based on the called party's quality score) to have services billed to a non-telephony utility of the called party's residence, such as described further in concurrently filed and commonly assigned U.S. patent application Ser. No. 11/386,056, filed Mar. 21, 2006 titled "MANAGEMENT OF PROVISION OF SERVICES BASED AT LEAST IN PART ON INFORMATION ABOUT A PAYOR'S UTILITY", the disclosure of which is hereby incorporated herein by reference. Thus, in certain embodiments, an "account type" may comprise a billing arrangement in which a payor is billed for a transaction via a utility (e.g., electric, gas, water, etc.) of the payor's residence.

At box 322 it is determined if solicitation of account prepayment has been successful. If so, appropriate accounts are established, such as in prepaid accounting system 229, and/or database records, such as within call database 221, are updated to reflect the prepaid status.

However, if it is determined at box 322 that solicitation of account prepayment has not been successful, processing according to the illustrated embodiment proceeds to box 324 wherein a customer quality determination is made. If it is determined that the party falls below a particular minimum level of customer quality, processing according to the illustrated embodiment proceeds to box 325 wherein future call attempts to the called party number are blocked. For example, call database 221 may be updated to reflect that transaction validation engine 220 should deny future call attempts.

However, if it is determined at box 324 that the party meets a particular minimum level of customer quality, processing according to the illustrated embodiment proceeds to box 326 wherein a determination is made as to whether BNA or similar information is available or may be obtained from the party.

If it is determined that no BNA or similar information is available or may be obtained from the party, processing according to the illustrated embodiment proceeds to box 327 wherein future call attempts to the called party number are blocked. For example, call database 221 may be updated to reflect that transaction validation engine 220 should deny future call attempts.

However, if it is determined at box 326 that BNA or similar information is available or may be obtained from the party, processing preferably proceeds to box 328 wherein a business relationship using secondary billing techniques, such using direct billing system 227, is established.

It should be appreciated that the steps of the above described flow diagram may be implemented with respect to a number of transaction processor configurations. For example, by falling back to post transaction processing where logic complementary to that of transaction validation engine 220 is not present in transaction processor 210, such as where transaction processor 210 comprises a class 5 switch, a class 4 switch, a central office switch, a pay telephone, an alternative inmate provider's call processor or the like, transaction validation engine 220 of the preferred embodiment is provided flexibility to provide transaction authorization processing with respect to a wide variety of transaction systems. Accordingly, transaction validation engine 220 and/or other systems of transaction system 200, such as customer service center 230, may provide a centralized platform for processing transactions. Moreover, by properly configuring transaction validation engine 220 and/or the other systems of transaction system 200 forming such a centralized platform, a transaction processor agnostic system may be implemented in which any number of transaction processor configurations may be accommodated.

Although the flow diagram above has been described with respect to initiating a transaction and establishing an account for a party to the transaction, it should be appreciated that embodiments of the present invention provide transaction processing implementing operations as described above in performing various transaction initiation, maintenance, and facilitation functional aspects. For example, transaction interrupt messaging and/or interaction as described above may be implemented with respect to a party to a transaction to provide information to the party with respect to a transaction or account status, such as a transaction limit, such as an account limit, a transaction velocity limit, etcetera, is being reached. Additionally or alternatively, transaction interrupt messaging and/or interaction may be implemented upon detection of undesired behavior, such as a party to the transaction performing an unpermitted act or attempting an activity indicative of fraudulent behavior. Accordingly, a transaction, such as a call, may be preceded, followed, and/or interrupted by a message regarding transaction and/or account status, perhaps invoking interaction with the party to replenish an account balance, establish a new business relationship with the service provider or other host to the transaction, and/or the like.

Figure 4:
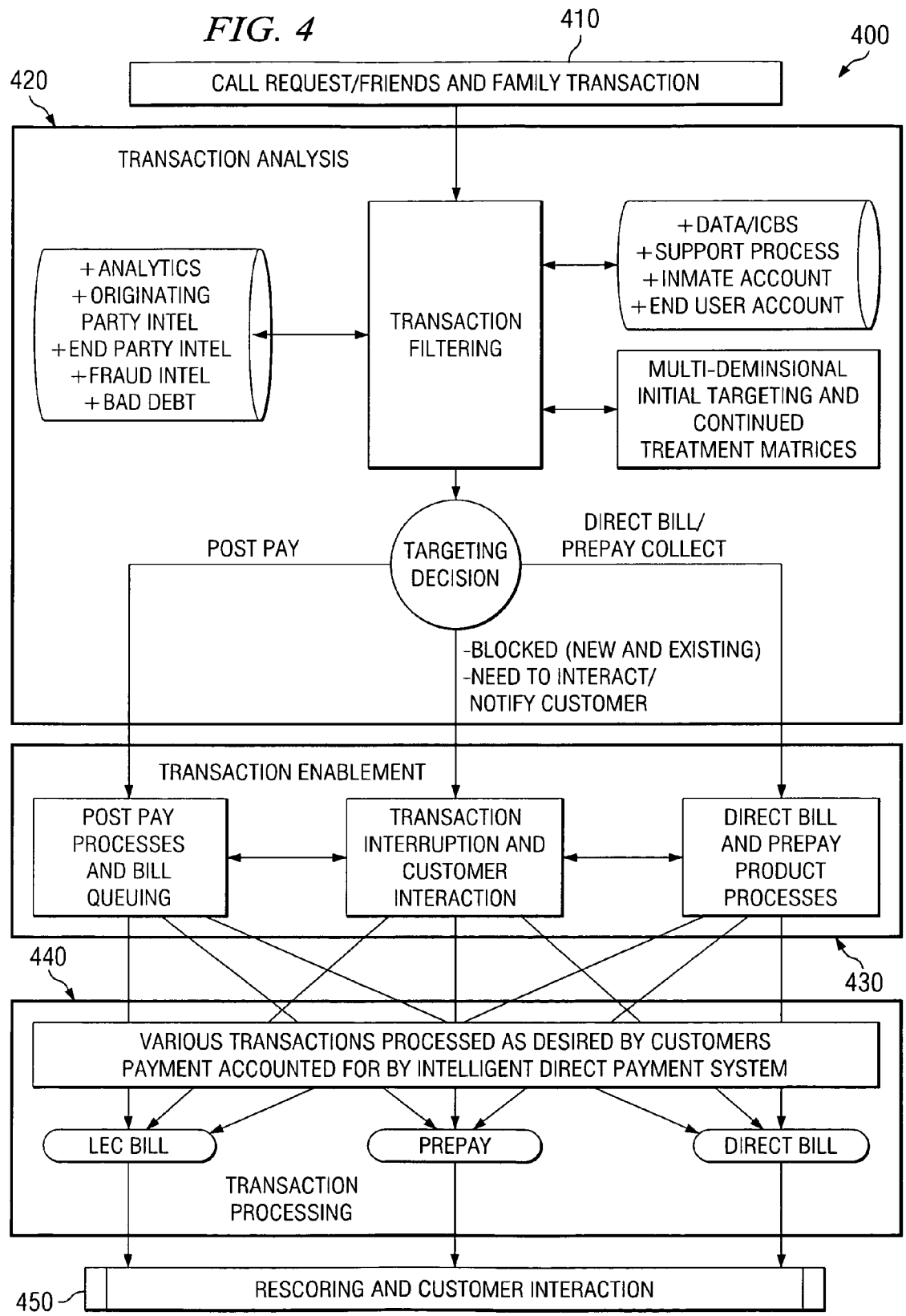
FIG. 4 shows a block diagram of operation of a transaction system adapted according to an embodiment of the present invention.

Directing attention to FIG. 4, a block diagram of transaction system 400 operable according to an embodiment of the present invention is shown. As illustrated in FIG. 4, a call request or other transaction request is initiated at box 410, such as may be initiated at transaction processor 210 by originating party stations 211 or end party station 250. Thereafter, box 420 provides transaction analysis with respect to the request, preferably utilizing transaction filtering such as may comprise authorization filters 224 and/or 225 and as may utilize various intelligence and information. Processing according to box 420 of the illustrated embodiment provides a transaction service product targeting decision based upon the quality of one or more parties to the transaction and the means by which charges may be rendered to them, e.g., post pay third party billing, post pay direct bill, or prepaid. If the available information and/or a quality metric indicates the transaction should otherwise be blocked or that interaction with one or more of the parties to the transaction is needed, box 420 may determine that transaction interruption for such interaction is desirable. Box 430 provides for transaction enablement according to the targeting decision of box 420. Accordingly, transaction interruption and customer interaction may be implemented at box 430, such as may include soliciting information and/or payment from a party, invoking transaction service need demonstrator 226, utilizing customer service center 230, etcetera, according to the targeting decision of box 420 in order to facilitate the transaction. Likewise, post pay processes, perhaps including intelligent bill queuing for administrative efficiency and revenue optimization, or direct bill and prepay processes, such as may be invoked for existing account situations or where sufficient information is available to establish such accounts, may be implemented at box 430 according to the targeting decision of box 420. Box 440 provides transaction processing, wherein various transactions may be processed as desired by customers with payment for the transactions and/or transaction services being accounted for by payment system intelligence in cooperation with appropriate billing systems, e.g., LEC billing system 223, direct billing system 227, and prepaid accounting system 229.

According to embodiment illustrated in FIG. 4, parties to the transactions may continue to be rescored, e.g., during a particular transaction and/or subsequent to completing a transaction, to update the targeting decision. For example, an initial targeting decision made in box 420 may be changed based upon subsequent rescoring and/or interaction at box 450.

It should be appreciated that embodiments of the present invention as described above provide a "no-touch transaction process" in which accounts may be established and managed, and transactions may be authorized and revenues optimized, without human intervention on behalf of the service provider or other host to the transaction. Additionally, such functionality is provided in real-time to thereby provide superior service to the parties utilizing the system.

Having described features and functionality of preferred embodiment commissary systems, transaction processors, transaction validation engines, and customer service centers herein, it should be readily appreciated that such features and functionality may be implemented as code operable upon processor-based systems. Accordingly, embodiments of any or all of commissary system 250, transaction processor 210, transaction validation engine 220, message system 280, and customer service center 230 may comprise a central processing unit (CPU), having memory associated therewith, such as random access memory (RAM), read only memory (ROM), disk memory, and/or the like, storing instruction sets to control operation as described herein. For example, transaction validation engine 220 of an embodiment of the present invention may be implemented upon a general purpose computer system platform, such as a computer system based upon the Intel PENTIUM family of processors as are well known in the art.

Figure 5:
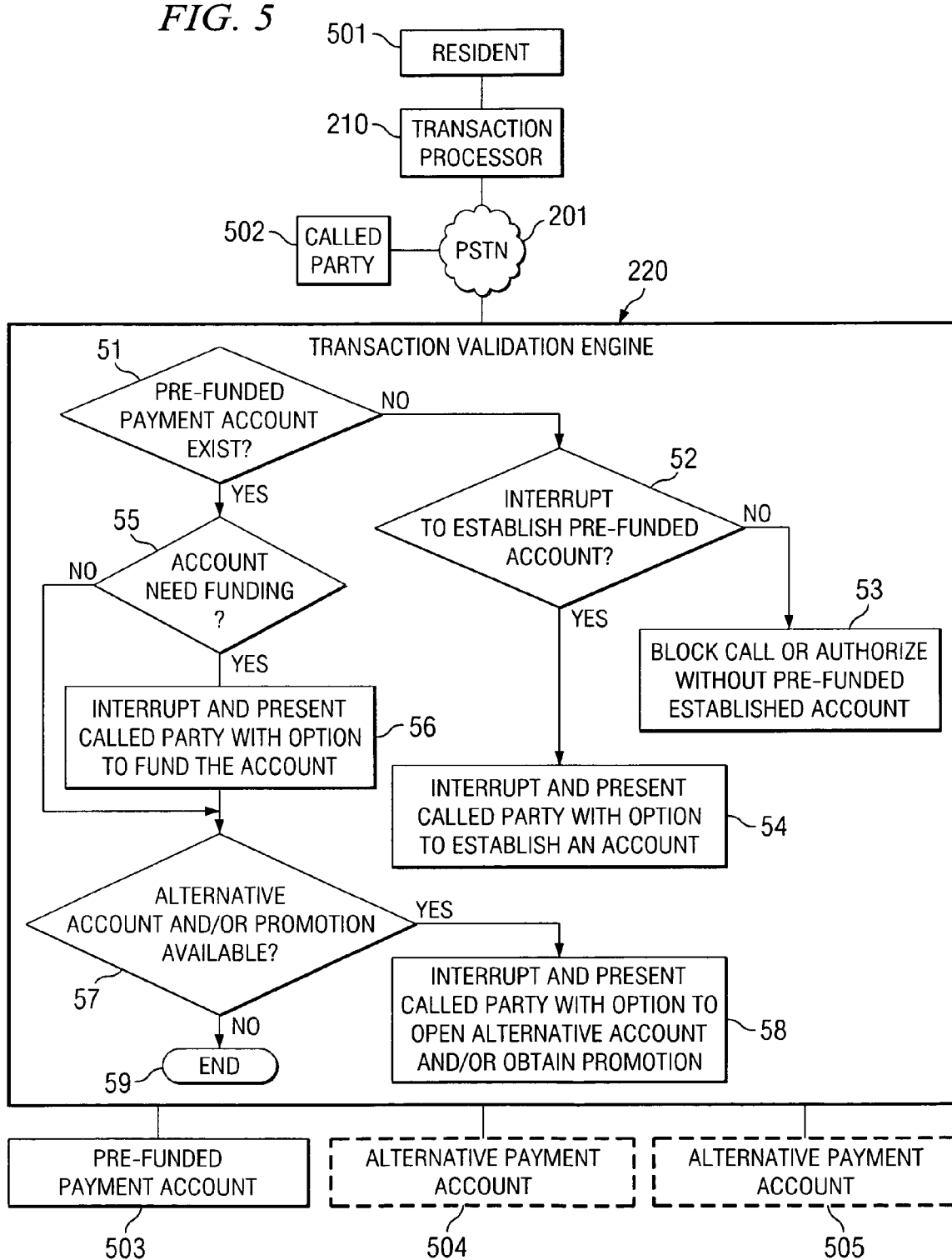
FIG. 5 shows an exemplary block diagram of a system according to one embodiment of the present invention.

FIG. 5 shows an exemplary block diagram of a system according to one embodiment of the present invention. In this example, a resident 501 of a controlled-environment facility conducts a transaction by interacting with transaction processor 210. For instance, resident 501 may use a station 211 (e.g., telephone) to call another party, such as called party 502, as described above with FIG. 2. In this example, a pre-funded (or "prepaid") account 503 has been established for resident 501 against which a host of the transaction can bill for charges associated with hosting the transaction. Transaction validation engine 220 is again provided, which may monitor transactions and determine whether to interrupt a transaction, as described further below.

In operational block 51, transaction validation engine 220 determines whether a pre-funded payment account exists for a transaction. If such a pre-funded account does not exist, operation advances to block 52 whereat the transaction validation engine 220 determines whether to interrupt the transaction to establish a pre-funded account. For instance, based on the quality score of the called party 502, the transaction may be permitted to proceed without a pre-funded account first being established, such as by permitting a collect call, etc. If determined in block 52 not to interrupt the transaction, operation advances to block 53 whereat the transaction validation engine 220 may either block the transaction or authorize the transaction without requiring that a pre-funded account be established (e.g., based on the party(ies) quality score(s)).

If determined in block 52 that the transaction is to be interrupted to establish a pre-funded account, operation advances to block 54 whereat transaction validation engine 220 interrupts the transaction and presents the called party 502 with an option to establish a pre-funded account, such as pre-funded account 503. If/when such a pre-funded account is established, the transaction may be resumed and/or a future transaction may be permitted and charged against the pre-funded account.

If determined in block 51 that a pre-funded payment account exists, as with pre-funded payment account 503 in this example, operation advances to block 55. In block 55, a determination is made regarding whether the pre-funded account 503 is in need of funding. That is, a determination is made as to whether the account's balance is below a threshold amount. If the account is in need of funding, operation advances to block 56, wherein the transaction is interrupted and the called party 502 is presented with an option to fund the account. Of course, if the called party is not the payor responsible for funding the account, the transaction validation engine 220 may, in certain embodiments, interrupt the transaction and call the payor (i.e., another party that is specified as responsible for funding the account) in attempt to request funding of the account in addition to or instead of providing called party 502 an option to fund the account.

If the account is determined in block 55 as not in need of funding or once it is funded in block 56, operation advances to block 57 where transaction validation engine 220 determines whether an alternative account and/or promotion is available for the party(ies) to this transaction. For instance, the party(ies) quality scores may have improved to a level at which a promotion (e.g., discounted rate) is available and/or at which an alternative account, such as alternative accounts 504 and 505, is available. Alternatively, the party(ies) quality scores may have declined to a level at which an alternative account is required by transaction validation engine. Transaction validation engine 220 may determine whether to offer an alternative account and/or promotion based upon any criteria established by a system administrator, and such criteria need not be based solely or at all on the party(ies) quality scores. In certain instances, for example, transaction validation engine 220 may interrupt a transaction to notify the party(ies) that the parties may receive a discounted rate for future transactions if they establish an alternative account, such as by establishing a prepaid account if one is not already in place or by establishing an account in which charges for transactions are billed to a utility of the party's residence.

If determined in block 57 that an alternative account and/or promotion is available, operation advances to block 58 whereat transaction validation engine 220 interrupts the transaction and presents the called party 502 (and/or resident 501) with an option to open an alternative account and/or receive an available promotion. Of course, if the called party is not the payor responsible for payment for transactions (e.g., if another party is designated as a responsible payor for transactions for resident 501), the transaction validation engine 220 may, in certain embodiments, interrupt the transaction and call the responsible payor in attempt to provide the payor with an option to open an alternative account and/or receive an available promotion.

Figure 6:
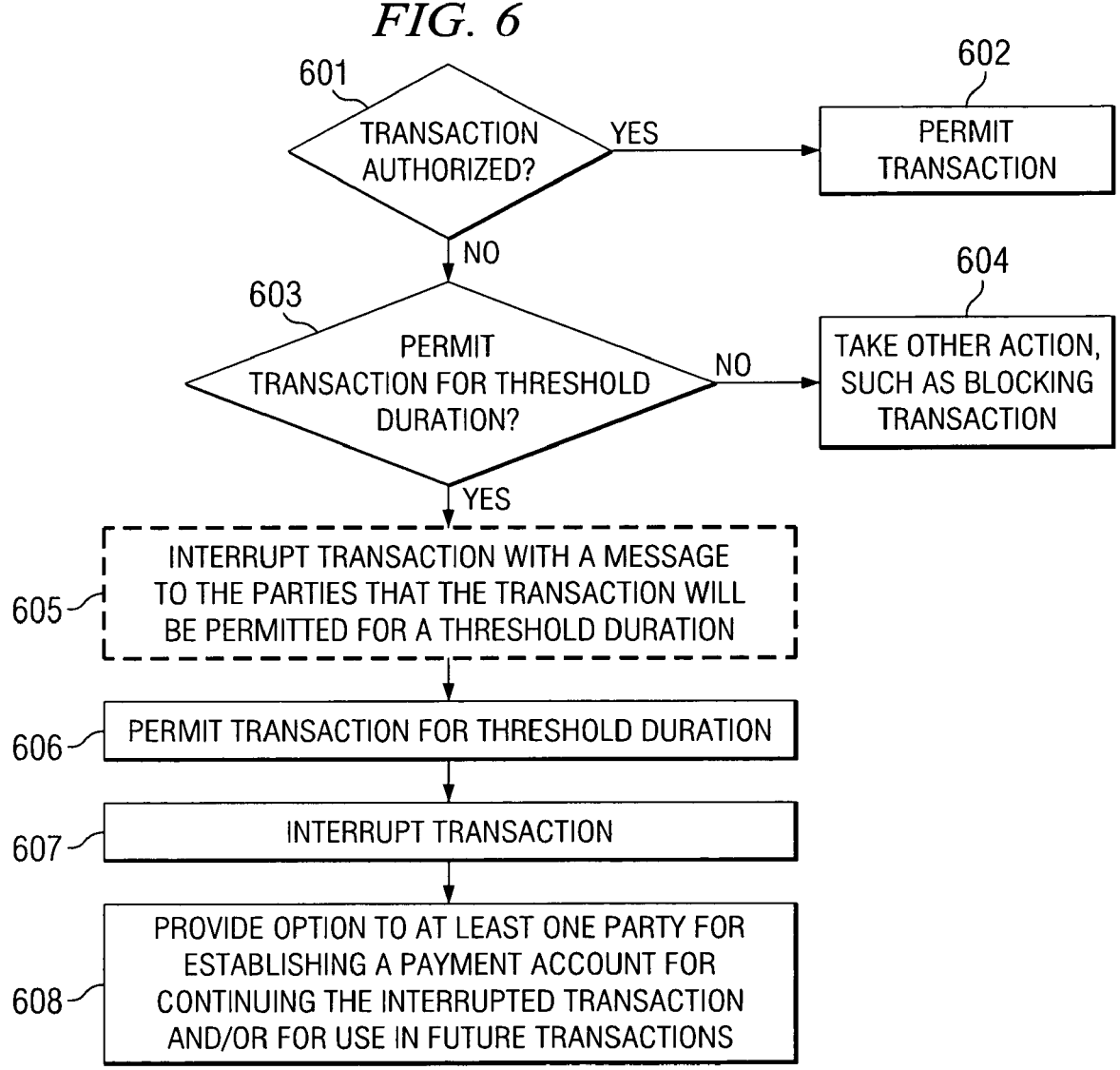
FIG. 6 shows an exemplary operational flow diagram of one embodiment of the present invention.

Turning to FIG. 6 an exemplary operational flow diagram of one embodiment of the present invention is shown. In block 601, transaction validation engine 220 determines whether a requested transaction is authorized. Such determination may be based at least in part on a quality score of party(ies) to the transaction, a balance available in a prepaid account, and/or other criteria, as examples. If the transaction is authorized, the transaction validation engine permits the transaction in block 602.

If the transaction is not authorized, operation advances to block 603 where the transaction validation engine 220 determines whether to permit the transaction for a threshold duration of time. For instance, as described above, certain embodiments permit an unauthorized transaction to be conducted for a limited period of time before interrupting the transaction to, for instance, establish a prepaid account for continuing the transaction. As an example, upon a new inmate in prison placing a first telephone call, the call may be permitted (even though it is unauthorized because, for instance, an unacceptably low quality score determined for the caller and/or called party) for a limited period of time. This allows the new inmate a limited period to inform the caller of the inmate's incarceration before the transaction is interrupted for prompting the called party to, for example, establish a prepaid account. As another example, upon a resident that has a prepaid account with an insufficiently low balance initiating a transaction, the transaction may be permitted for a limited duration of time (even though it is unauthorized because, for instance, insufficient funds exist in the account for the transaction). This allows the resident to speak briefly with the called party before the transaction is interrupted for prompting the called party to, for example, fund the prepaid account. This may encourage the called party to fund the prepaid account, whereas if the transaction were not permitted at all because of the low remaining balance, the host of the transaction may forego this possible revenue. Of course, if the resident has previously attempted a transaction with the low account balance (without an intervening funding of the account), transaction validation engine 220 may deny the limited duration transaction in block 603 (so that the resident cannot repeatedly receive short transactions that are unauthorized), wherein operation advances to block 604 where transaction validation engine 220 takes some other action, such as blocking the transaction.

If determined in block 603 that a threshold duration transaction is to be permitted, operation may, in certain embodiments, advance to block 605 (shown in dashed lines as an optional operation for this example). In block 605, the transaction is interrupted and a message is provided to the parties that the transaction will be permitted for a threshold duration. In this way, the parties may be informed in advance that the transaction is of limited duration. Accordingly, a newly incarcerated inmate to a prison, for instance, may know to make efficient use of the available time in order to quickly inform the called party of his incarceration and request that the party establish a prepaid account for the inmate.

In block 606, the transaction validation engine 220 then permits the transaction (e.g., telephone call) for the threshold duration of time. In block 607, once the threshold duration of time has lapsed, transaction validation engine 220 interrupts the transaction. In block 608, transaction validation engine 220 provides an option to at least one party for establishing an account for continuing the interrupted transaction and/or for use in future transactions. The party to whom the option is provided may be a party to the interrupted transaction. In certain embodiments, the party may be a different party, such as a designated party that is responsible for payment for the residence's transactions. For instance, the transaction validation engine 220 may, in certain embodiments, call a designated "payor" party (e.g., a relative of the resident) if the designated payor is not a party to the interrupted transaction, to provide the designated payor the option of operational block 608.

Although preferred embodiments have been described herein with respect to calling systems, it should be appreciated that the concepts of the present invention are not so limited. Accordingly, embodiments of the present invention may be applied to a variety of transaction systems, such as commissary transaction systems.

Likewise, the present invention is not limited to use with respect to providing for collect calls. For example, embodiments of the present invention may be applied to telecommunications transaction in the casual calling market, such as with respect to 10-10 type 1 plus calling. Further, according to embodiments of the present invention, the transaction processor 210, transaction validation engine 220, and/or other components of a system may be implemented and executed local to a controlled-environment facility, or some or all of such components may be implemented and executed remote from a controlled-environment facility (e.g., via a communication network coupling such remote components to the controlled-environment facility).

According to certain embodiments, the account management system may dynamically switch a party from one type of account to another type of account. For instance, friends and family members of a prisoner which have direct billing or LEC billing types for calls with the prisoner may be switched to pre-pay billing in real-time. For instance, if funds are added to a prepaid account for a prisoner, the account management system may dynamically change the account type for the prisoner from LEC/Direct billing to prepaid. The account type may then remain prepaid for as long as prepaid funds are available in the pre-established prepaid account. When the prepaid funds are depleted, the account management system may dynamically change the account type for the prisoner back to the original account type (e.g., direct billing or LEC billing). If a call is in progress and the prepaid funds are depleted (i.e., the prepaid account balance reaches $0), the account management system may enable the call to continue and apply the charges incurred after the depletion of the prepaid account to the original account type (e.g., direct bill or LEC bill). Of course, the interrupt messaging techniques described herein may be employed to inform the called and/or calling parties of the depletion of the prepaid account, and the parties may be provided an opportunity to fund the prepaid account if so desired.

Customer quality and scoring criteria may be considered by the account management system in dynamically deciding when to change the account type to employ for a prisoner (e.g., whether to require prepaid, or whether to permit direct billing, LEC billing, or some other account type). However, if a customer (e.g., a called party) has a score that qualifies for an account type other than prepaid, such customer may be permitted to conduct a call with a prisoner via the account type for which he qualifies if a prepaid account is depleted. That is, in certain embodiments, if a prepaid account is established for a prisoner, the prepaid account is used for payment for calls even with parties who qualify for another type of account, but if the prepaid account is depleted, the call with such a qualifying party may be permitted by the account management system to continue with charges being billed via another type of account for which the party qualifies (e.g., direct billing, LEC billing, etc.).

In certain embodiments, interrupt messaging may be employed to offer the parties an option of which accounts to employ for services rendered during a given transaction. For instance, if a prisoner has a prepaid account established and calls a party having a score that qualifies the called party for another type of account (e.g., direct billing), the account management system may generate an interrupt message to offer the prisoner or the called party an option of whether to utilize the prepaid account or another type of account for which the party qualifies. The system may offer a discounted rate for utilization of the prepaid account, which may encourage the called party to utilize the prepaid account first, and once the prepaid account is depleted the charges incurred thereafter, if any, may be charged to the other type of account for which the called party qualifies (e.g., direct billing).

Additionally, in certain embodiments, new residents (e.g., new inmates or prisoners to a correctional facility) may be afforded a threshold amount (e.g., $25) of "credit" that can be used for a transaction irrespective of the quality scoring of the party(ies) involved in a transaction. Thus, the account management system may authorize transactions up to the threshold amount for a new resident irrespective of the quality scoring of the party(ies) involved. Of course, the initial transaction may nevertheless be billed or otherwise steps may be taken in attempt to collect for such transaction, but a transaction that would not otherwise be permitted (e.g., without a pre-established prepaid account or other type of account being established) due to the low quality scores of the parties involved may nevertheless be permitted up to the threshold amount. For instance, a new prisoner may be permitted to place a collect call to a third party that has a low quality score such that it account management system would typically deny the placement of the call; and the call may be permitted up to the initial threshold amount (e.g., $25). Of course, the initial threshold amount may not be a true "credit" or "gift" to the parties, but may instead be an "at-risk" amount. That is, the service provider may attempt to collect for the transaction (e.g., by billing the called party for the collect call in this example), but the initial amount is considered "at-risk" because it likely will not be paid due to the called party's low quality score.

By setting such an initial threshold amount that can be initially used even in an "at-risk" manner (i.e., in a situation that would not otherwise be permitted due to low quality scores), the prisoner and/or called party may be afforded an opportunity to be introduced to the services available (i.e., the telephony services provided by the prison's telephony service provider in this example). The initial threshold amount limits the at-risk exposure of the service provider, while enabling an introduction of its services to the parties involved in the transaction. For instance, the above-described interrupt messaging may be used to inform the parties of how to establish a pre-paid account or other type of account (or "billing arrangement") that may be permitted based, for example, on the party's quality scores. This may ultimately enable the service provider to recognize greater revenue than if the initial call were denied altogether.

Once the threshold amount is exceeded, the account management system may, depending on the quality score of the parties involved in the transaction, interrupt the transaction and require an alternative account be established (e.g., a prepaid account, etc.). On the other hand, if the quality score of the parties involved in the transaction is sufficiently high, the account management system may permit the transaction to continue even beyond the depletion of the initial threshold amount. In any case, the account management system may utilize the above-described interrupt messaging to inform the parties of various account alternatives that are available to them for future transactions, and in some instances may offer discounted rates or other incentives for certain preferred types of accounts, such as prepaid accounts.

In certain embodiments, the above-mentioned initial threshold amount may be variable depending on certain factors, such as the expected length of residency by the resident at the controlled-environment facility (e.g., based on the expected length of incarceration of a prisoner). For instance, because a prisoner that is expected to be incarcerated for a longer period of time will remain visible to the service provider, a greater initial threshold amount may be afforded such prisoner, while a prisoner that is expected to be released quickly may be afforded a much smaller initial threshold amount (because the service provider will quickly lose any visibility and/or leverage over such prisoner).

Figure 7:
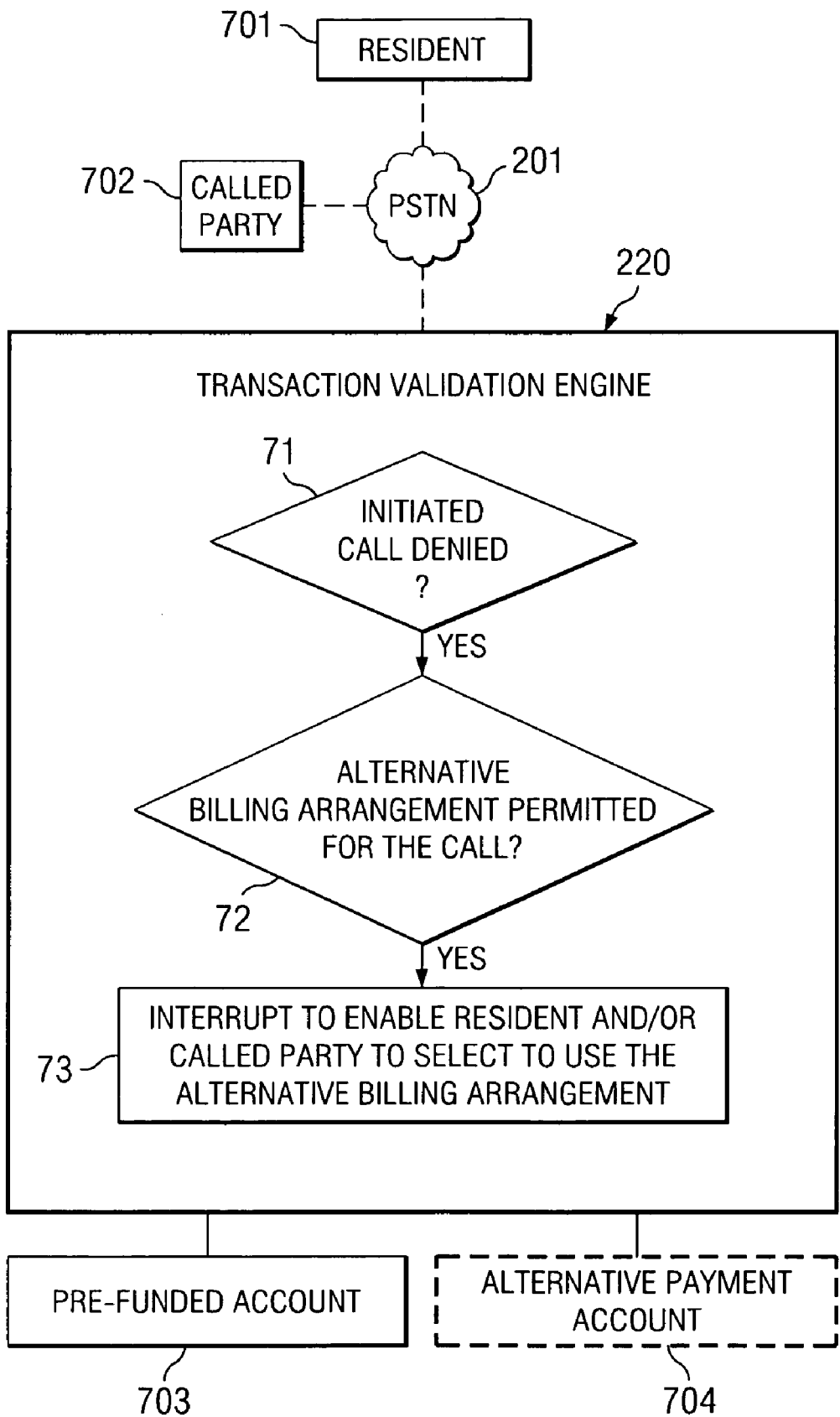
FIG. 7 shows an exemplary block diagram of a system according to another embodiment of the present invention.

Certain embodiments of the present invention employ interrupt messaging for transactions that would otherwise be denied, thus aiding in allowing more of the transactions to be completed. Turning to FIG. 7, an exemplary block diagram of a system according to one embodiment of the present invention is shown. In this example, a resident 701 of a controlled-environment facility may conduct a transaction by interacting with a transaction processor, such as transaction processor 210 described above. For instance, resident 701 may use a station 211 (e.g., telephone) to call another party, such as called party 702, as described above with FIG. 2. In this example, a pre-funded (or "prepaid") account 703 has been established for resident 701 against which a host of the transaction can bill for charges associated with hosting the transaction. Transaction validation engine 220 is again provided, which may monitor transactions and determine whether to interrupt a transaction, as described further below.

In operational block 71, transaction validation engine 220 determines whether an initiated transaction (e.g., call) is denied. Such a call may be denied by the transaction processor 210 or by the called party, as examples. For instance, called party 702 may refuse to accept charges for a collect call from resident 701. If the initiated call is denied in block 71, operation advances to block 72 whereat the transaction validation engine 220 determines whether an alternative billing arrangement is permitted for the call. For instance, the transaction validation engine 220 may determine whether a pre-funded account 703 is available with sufficient balance to enable the call to be placed and billed against such pre-funded account 703. As another example, the transaction validation engine 220 may determine whether another alternative payment account 704 can be used for placing the call, wherein such determination may take into account various criteria, including risk scores assigned to the resident 701 and/or the called party 702. If determined in block 72 that an alternative billing arrangement is permitted for the initiated call, operation advances to block 73 whereat transaction validation engine 220 interrupts the call and presents the resident 701 and/or the called party 702 with an option to select to connect the call using the alternative billing arrangement. Of course, once the call is connected, the transaction validation engine 220 may monitor the call and determine whether to interrupt the call as described above.

Figure 8:
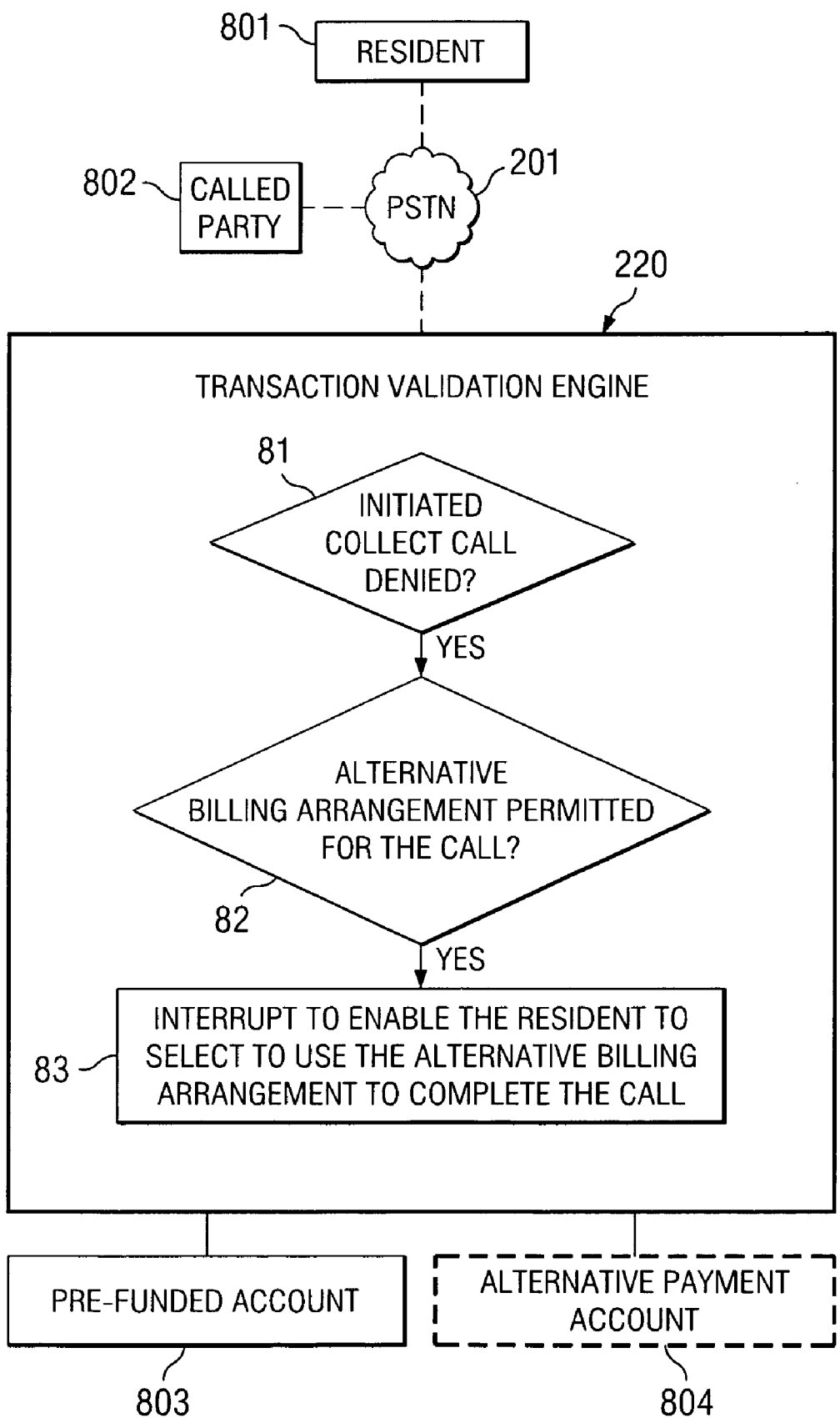
FIG. 8 shows an exemplary block diagram of a system for enabling a resident to select an alternative account for billing of a denied collect call according to one embodiment of the present invention.

FIG. 8 shows an exemplary block diagram of a system according to one embodiment of the present invention, wherein a resident initiates a collect call that is denied. In this example, a resident 801 of a controlled-environment facility initiates a collect call (e.g., by interacting with a transaction processor, such as transaction processor 210 described above) to called party 802. In this example, a pre-funded (or "pre-paid") account 803 has been established for resident 801 against which a host of the transaction can bill for charges associated with hosting the transaction. Transaction validation engine 220 is again provided, which may monitor transactions and determine whether to interrupt a transaction, as described further below.

In operational block 81, transaction validation engine 220 determines whether the initiated collect call is denied. Such collect call may be denied by the transaction processor 210 or by the called party 802, as examples. For instance, called party 802 may refuse to accept charges for the collect call initiated from resident 801. If the initiated collect call is denied in block 81, operation advances to block 82 whereat the transaction validation engine 220 determines whether an alternative billing arrangement is permitted for the call. For instance, the transaction validation engine 220 may determine whether a pre-funded account 803 is available with sufficient balance to enable the call to be placed and billed against such pre-funded account 803. As another example, the transaction validation engine 220 may determine whether another alternative payment account 804 can be used for placing the call, wherein such determination may take into account various criteria, including risk scores assigned to the resident 801 and/or the called party 802. If determined in block 82 that an alternative billing arrangement is permitted for the initiated call, operation advances to block 83 whereat transaction validation engine 220 interrupts the call and presents the resident 801 with an option to select to connect the call using the alternative billing arrangement. Thus, the resident 801 may be provided with an option of using any of various payment accounts that may be permitted for connecting the call. Of course, once the call is connected, the transaction validation engine 220 may monitor the call and determine whether to interrupt the call as described above.

Thus, in certain embodiments, the denial of the collect call (or other transaction) may trigger an interrupt message to be played to the called party and/or the resident. For example, an interrupt message may be played to the resident to offer the resident an option to attempt the call with a different payment arrangement (e.g., to attempt the call with billing the call to a pre-funded account of the resident). As another example, an interrupt message may be played to the called party inquiring as to whether the called party would like to establish a different type of account, such as a pre-funded account, to which the call (and/or future calls from the resident) may be billed at a discounted price compared to that of the collect call.

In certain embodiments, upon detecting that the resident is initiating a given type of transaction, such as a collect call, the system may determine whether a pre-funded account (or other alternative account) is available for use by the resident, wherein an interrupt message may be used to provide the resident with the option of completing the transaction (e.g., call) to be billed via the pre-funded account (or other alternative account) rather than continuing with it as initiated (e.g., as a collect call). It may be more desirable to the telephone service provider to encourage the resident to use one type of account, such as a pre-funded account, over another type of account, such as collect calling in which the charges for the call are to be collected from the called party after the call is completed. Thus, the resident may have the option of how to attempt to place the call with the corresponding billing arrangement that is available. Accordingly, in certain embodiments, the interrupt messaging may be used to provide the resident with an option of an alternative account that may be used for a given initiated call (e.g., initiated collect call) before such initiated call is denied (e.g., before a called party denies the collect call). Of course, the interrupt messaging may again be used, as mentioned above, if/when the call is denied.

For example, FIG. 9 shows an exemplary block diagram of a system according to one embodiment of the present invention. In this example, a resident 901 of a controlled-environment facility initiates a call that is to be billed via a first type of account (e.g., a collect call) to called party 902. In this example, a pre-funded (or "prepaid") account 903 has been established for resident 901 against which a host of the transaction can bill for charges associated with hosting the transaction. Transaction validation engine 220 is again provided, which may monitor transactions and determine whether to interrupt a transaction, as described farther below.

In operational block 91, transaction validation engine 220 detects an initiation of a call that is to be billed to a first type of account. For example, an initiated collect call from resident 901 to called party 902 may be detected in block 91. In block 92, transaction validation engine 220 determines whether an alternative type of account is preferred for the call. For instance, an alternative type of account may be preferred because it provides better assurance to the host of the transaction of payment for the transaction (as with a pre-funded account), and/or an alternative type of account may be preferred because it provides a better rate (e.g., discounted rate) for the transaction to the resident and/or the called party. If determined in block 92 that such an alternative type of account is available, operation advances to block 93 whereat transaction validation engine 220 interrupts the call and presents the resident 801 with an option to select to connect the call using the alternative type of account. For example, if detected in block 91 that the resident 901 is initiating a collect call, the interrupt message in block 93 may allow the resident 901 to select to use the pre-funded account 903 for completing the call, rather than continuing with the call as a collect call. In such case, the resident may be informed of a discounted rate and/or other incentives for using the pre-funded account 903. If the resident selects the pre-funded account 903 (or other available account), the call is connected and billed via the selected account.

Otherwise, the collect call may be attempted as initiated by the resident. If determined in block 94 that the initiated call is denied (e.g., the called party 902 denies the collect call), operation advances to block 95 whereat the transaction validation engine 220 determines whether an alternative billing arrangement is permitted for the call. For instance, the transaction validation engine 220 may determine whether a pre-funded account 903 is available with sufficient balance to enable the call to be placed and billed against such pre-funded account 903. As another example, the transaction validation engine 220 may determine whether another alternative payment account 904 can be used for placing the call, wherein such determination may take into account various criteria, including risk scores assigned to the resident 901 and/or the called party 902. If determined in block 95 that an alternative billing arrangement is permitted for the initiated call, operation advances to block 96 whereat transaction validation engine 220 interrupts the call and presents the resident 901 with an option to select to connect the call using the alternative billing arrangement. Thus, the resident 901 may be provided with an option of using any of various payment accounts that may be permitted for connecting the call. Of course, once the call is connected, the transaction validation engine 220 may monitor the call and determine whether to interrupt the call as described above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   identifying, by a transaction processor, initiation of a transaction between a resident of a controlled-environment facility and another party, wherein the initiated transaction is to be paid via a first type of account;
   determining, by the transaction validation engine, whether the initiated transaction is denied;
   when the initiated transaction is denied, completing a communication connection between the resident and the another party;
   permitting said communication connection between said resident and the another party to continue for a threshold duration of time;
   interrupting, by a transaction validation engine after the threshold duration of time, the communication connection and interacting with at least one of the resident and another party, wherein the interacting comprises providing to at least one of the resident and the another party an option to complete the transaction with the transaction to be paid via a second type of account; and
   completing the initiated transaction wherein the initiated transaction is paid via the second type of account.

2. The method of claim 1 wherein the initiated transaction is a collect call from the resident to the another party.

3. The method of claim 2 wherein the collect call is denied by the another party.

4. The method of claim 2 wherein the second type of account is a pre-funded account.

5. The method of claim 2 wherein the interacting comprises providing the resident an option to complete the transaction with the transaction to be paid via the second type of account.

6. The method of claim 5 wherein the second type of account is a pre-funded account.

7. A method comprising:
   identifying, by a transaction processor, initiation of a collect call between a resident of a controlled-environment facility and another party;
   determining, by the transaction validation engine, whether said collect call is denied; and
   when determined that said collect call is denied, completing a call connection between the resident and the another party;
   permitting said call connection between said resident and the another party to continue for a threshold duration of time, and
   interrupting, by the transaction validation engine after the threshold duration of time, the call connection for interaction with at least one of said resident and said another party.

8. The method of claim 7 wherein the interacting comprises providing to at least one of the resident and the another party an option to continue the call with the call to be paid via a selected type of account.

9. The method of claim 8 wherein the selected type of account comprises at least one of collect call and a pre-funded account.

10. The method of claim 7 wherein the interaction comprises providing to at least one of the resident and the another party an option to continue the call with the call to be paid via a pre-funded account.

11. The method of claim 7 wherein the collect call is denied by the another party.

12. The method of claim 7 wherein the interaction comprises providing the resident an option to continue the call with the call to be paid via a selected type of account.

13. The method of claim 12 wherein the selected type of account is a pre-funded account.

14. The method of claim 7 further comprising:
   determining whether to permit said call for said threshold duration of time when determined that said call is denied.

15. The method of claim 14 wherein said determining whether to permit said call for said threshold duration of time is based at least in part on whether said resident has previously received for a threshold duration of time a call that was denied.

16. A method comprising:
   detecting, by a transaction processor, an initiated transaction between a resident of a controlled-environment facility and another party, wherein the initiated transaction is to be paid for via a first type of account;
   determining, by the transaction validation engine, that the initiated transaction is denied;
   when the initiated transaction is denied, completing a communication connection between the resident and the another party;
   permitting said communication connection between said resident and the another party to continue for a threshold duration of time;
   interrupting, by the transaction validation engine after the threshold duration of time, the communication connection and interacting with the resident to provide the resident with an option to perform the denied initiated transaction to be paid for via a second type of account; and
   completing the initiated transaction, by the transaction processor, wherein the initiated transaction is paid via the second type of account.

17. The method of claim 16 wherein the initiated transaction is a collect call from the resident to the another party.

18. The method of claim 17 wherein the another party denies the collect call.

19. The method of claim 17 further comprising:
determining whether a pre-funded account is available to which the call can be charged.

20. The method of claim 19 wherein the interacting comprises:
providing the resident with an option to perform the denied call with the call to be paid for via the pre-funded account.

21. The method of claim 16 wherein said detecting, determining, and interrupting are performed by a transaction validation engine.

22. A method comprising:
detecting, by a transaction validation engine, an initiated transaction between a resident of a controlled-environment facility and another party, wherein the initiated transaction is to be paid for via a first type of account;
determining, by the transaction validation engine, that the initiated transaction is denied;
when the initiated transaction is denied, completing a communication connection between the resident and the another party;
allowing the initiated transaction between the resident and the other party to continue for a predetermined duration of time;
determining, by the transaction validation engine, whether another type of account other than the first type of account is preferred for payment for the initiated transaction;
when determined that the another type of account is preferred, interrupting the initiated transaction after the predetermined duration of time, by the transaction validation engine, and interacting with the resident to provide the resident with an option to perform the initiated transaction to be paid for via the another type of account.

23. The method of claim 22 wherein the transaction is a collect call from the resident to the another party.

24. The method of claim 23 wherein the another type of account is a pre-funded account for the resident.

25. The method of claim 22 further comprising:
determining, by the transaction validation engine, that the initiated transaction is denied; and
interrupting the initiated transaction, by the transaction validation engine, and interacting with the resident to provide the resident with an option to perform the denied initiated transaction to be paid for via different type of account than that used when the initiated transaction was denied.

26. A method comprising:
detecting, by a transaction validation engine, an initiated transaction between a resident of a controlled-environment facility and another party, wherein the initiated transaction is to be paid for via a first type of account;
determining, by the transaction validation engine, that payment by the first type of account is denied;
when determined that payment by said first type of account is denied, completing a call connection between said resident and the another party;
permitting said call connection between said resident and the another party to continue for a threshold duration of time;
determining, by the transaction validation engine, whether another type of account other than the first type of account is preferred for payment for the initiated transaction;
when determined that the another type of account is preferred, interrupting the call connection after the threshold duration of time by the transaction validation engine, and
interacting with the resident to provide the resident with an option to continue the initiated transaction to be paid for via the another type of account.

27. The method of claim 1 wherein the initiated transaction is a commissary goods purchase by the resident.

28. The method of claim 1 wherein the initiated transaction is a commissary goods purchase by the another party.

29. The method of claim 16 wherein the initiated transaction is a commissary goods purchase by the resident.

30. The method of claim 16 wherein the initiated transaction is a commissary goods purchase by the another party.

31. The method of claim 22 wherein the initiated transaction is a commissary goods purchase by the resident.

32. The method of claim 22 wherein the initiated transaction is a commissary goods purchase by the another party.

* * * * *